(12) United States Patent
Fukushima et al.

(10) Patent No.: US 7,738,775 B2
(45) Date of Patent: Jun. 15, 2010

(54) RECORDING/REPRODUCING DEVICE

(75) Inventors: Toshiyuki Fukushima, Osaka (JP);
Rina Matsuda, Osaka (JP); Seigo Okazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 959 days.

(21) Appl. No.: 10/588,972

(22) PCT Filed: Jun. 10, 2005

(86) PCT No.: PCT/JP2005/010672

§ 371 (c)(1),
(2), (4) Date: Aug. 10, 2006

(87) PCT Pub. No.: WO2005/122166

PCT Pub. Date: Dec. 22, 2005

(65) Prior Publication Data
US 2007/0133945 A1   Jun. 14, 2007

(30) Foreign Application Priority Data
Jun. 11, 2004  (JP) .............................. 2004-174657

(51) Int. Cl.
*H04N 5/91* (2006.01)
(52) U.S. Cl. .......................................... 386/94; 386/95
(58) Field of Classification Search .................. 386/46, 386/52, 83, 95, 125, 126, 94
See application file for complete search history.

(56) References Cited

U.S. PATENT DOCUMENTS 5,381,275 A * 1/1995 Nitta et al. .................... 360/48
5,949,688 A * 9/1999 Montoya et al. ............. 700/235
6,711,464 B1 * 3/2004 Yap et al. .................... 700/233

FOREIGN PATENT DOCUMENTS

| EP | 0 365 306 | 4/1990 |
|----|-----------|--------|
| JP | 1-118921  | 5/1989 |

(Continued)

OTHER PUBLICATIONS

Partial English translation of Japanese Patent Application No. 2001-332021, which was cited in the IDS filed Sep. 15, 2006.

*Primary Examiner*—Huy T Nguyen
(74) *Attorney, Agent, or Firm*—Wenderoth, Lind & Ponack, L.L.P.

(57) ABSTRACT

The present invention provides a recording/reproducing device which shortens time required for dubbing, when a user performs the dubbing of program data. The recording/reproducing device of the present invention is a recording/reproducing device which records and reproduces information, including: a tuner control unit 4 which obtains first information; a recording/reproduction control unit 13 which records, in an HDD 15, the first information obtained by the tuner control unit 4, and records, in an optical disc held in the optical disc drive 14, second information which is information having the same content as the first information; a CPU 5 which invalidates the second information; and a user input control unit 9 which receives an instruction requesting the first information recorded in the HDD 15 to be recorded in the optical disc. In the case where the user input control unit 9 receives the instruction, the CPU 5 validates the invalidated second information.

19 Claims, 13 Drawing Sheets

FOREIGN PATENT DOCUMENTS

| | | |
|---|---|---|
| JP | 10-064178 | 3/1998 |
| JP | 11-018039 | 1/1999 |
| JP | 11-259964 | 9/1999 |
| JP | 2000-149505 | 5/2000 |
| JP | 2001-332021 | 11/2001 |
| JP | 2001-344898 | 12/2001 |
| JP | 2001-357452 | 12/2001 |
| JP | 2002-184104 | 6/2002 |
| JP | 2003-123386 | 4/2003 |
| JP | 2003-179852 | 6/2003 |

* cited by examiner

FIG. 12

Program data, which is not dubbed in optical disc in which ejection is instructed, is present in HDD. Select a program data to be dubbed.

| Selection | Title name | Channel | Recording date | Recording mode | Total time |
|---|---|---|---|---|---|
| ☑ | Title A | Terrestrial A 2ch | 2004/01/01 | XP | 1H 25M 10S |
| ☐ | Title B | BS-D 103ch | 2004/02/02 | SP | 10M 00S |
| ☐ | Title C | Terrestrial D 011ch | 2004/03/12 | AUTO | 3H 10M 10S |

Execute

RECORDING/REPRODUCING DEVICE

TECHNICAL FIELD

The present invention relates to a recording/reproducing device for recording/reproducing information such as a video signal and an audio signal.

BACKGROUND ART

As a medium for recording and reproducing video and audio, a disc-shaped recording medium as well as a conventional tape-shaped recording medium have become widespread; for example, an optical disc such as a DVD-RAM (Digital Versatile Disk Random Access Memory) and a DVD-R (Digital Versatile Disk Recordable), and an HDD (Hard Disk Drive). In addition, in recent years, the increase in capacity of recording media has been remarkable, and aside from the increased capacity of the HDD, optical discs have seen the emergence of a new, large-capacity medium, such as a Blu-ray disc. There is an increasing demand for recording high-quality video and audio, using these large-capacity media.

Furthermore, recording/reproducing devices that support a plurality of recording media such as an HDD and an optical disc have emerged recently, and dubbing video and audio recorded in one recording medium to the other recording medium is spreading as a use of these recording media. Technology concerning performing dubbing between these recording media is also disclosed (for example, see Patent Document 1).

Patent Document 1: Japanese Laid-Open Patent Application No. 2000-149505 Publication

DISCLOSURE OF INVENTION

Problems that Invention is to Solve

However, as increase of recording media capacity is progressing, size of data including video and audio recorded in such recording media (hereinafter referred to as "program data") is increasing. Therefore, a problem arises in that the time required for dubbing program data becomes long, and a user experiences more stress with dubbing.

In addition, regarding the recording/reproducing device, aside from the types of recording media to be used, there has also been an increase in the types of video and audio formats to be used, specifically, such as an MPEG2-TS (Moving Picture Experts Group phase 2 Transport Stream) and MPEG2-PS (Moving Picture Experts Group phase 2 Program Stream). While the MPEG2-TS is used as a format in the case where a digital broadcast program is recorded without modification and where it is recorded in a Blu-ray disc, the MPEG2-PS is used as a format in the case where data is recorded in the DVD-RAM, DVD-R and the like. On the other hand, the HDD uses one or more of the aforementioned formats or a format other than those formats. For this reason, when a program is attempted to be dubbed between media which apply respective different formats, conversion processing on the formats is required, which becomes a factor to prolong the time required for such dubbing.

In addition, for example, there is a case where the program data recorded in a certain recording medium is dubbed to the same or another recording medium by lowering the bit rate. It is a case, for example, where the amount of program data (hereinafter also referred to as "size") is reduced by lowering the bit rate of the program data.

The conversion processing of such bit rate is one of the factors that prolongs the dubbing time. It should be noted that the aforementioned format conversion or the dubbing requiring bit rate conversion are referred to as conversion dubbing.

Furthermore, in the case where program data designated as "one generation copy available" is recorded in a recording medium, the program data can not be doubly present at the same time by copying the program data. Therefore, in the case where the program data is dubbed, a move is performed which is one of the forms of dubbing. The move is dubbing requiring deletion of original data. When the move is performed, it is necessary to perform reprocessing of copyright protection suited for a recording medium, for example, re-encryption processing and processing for modification of cipher key and the like. With this, the time required for the move is also prolonged.

The present invention was made in view of such circumstances, and it is aimed at providing a recording/reproducing device that shortens the time required for dubbing, when a user performs the dubbing of information such as program data.

Means to Solve the Problems

In order to achieve the aforementioned object, the recording/reproducing device in the present invention is a recording/reproducing device which records and reproduces information, which includes: an obtainment unit for obtaining first information; an information recording unit for recording the first information in a first recording area and recording second information in a second recording area, the first information being obtained by the obtainment unit, and the second information having the same content as the first information; an invalidation unit for invalidating the second information; a receiving unit for receiving a recording instruction which requests the first information recorded in the first recording area to be recorded in the second recording area; and a validation unit for validating the invalidated second information in the case where the receiving unit receives the recording instruction.

In addition, it is also possible that the recording/reproducing device in the present invention includes a management data recording unit for recording, in a management data recording area, management data which is data indicating whether the second information is valid or invalid, wherein the invalidation unit invalidates the second information by making the management data recording unit record, in the management data recording area, management data indicating that the second information is invalid, and the validation unit validates the second information by making the management data recording unit update the management data so as to indicate that the second information is valid.

In addition, it is also possible that the recording/reproducing device in the present invention includes a judgment unit for judging whether or not there is a predetermined relationship between attribute information of the first information obtained by the obtainment unit and attribute information of the information which is recorded in the second recording area, wherein the information recording unit records the second information in the second recording area in the case where the judgment unit judges that there is the predetermined relationship between the attribute information of the first information and the attribute information of the information which is recorded in the second recording area.

In addition, it is also possible that the recording/reproducing device in the present invention includes a second information generation unit for generating the second information by converting a format of the first information to a format other than the format of the first information, wherein the information recording unit records the second information in the second recording area, the second information being generated by the second information generation unit, and the second information generation unit converts the format of the first information to a format corresponding to an available space, which is the space where additional recording is possible, in the second recording area.

In addition, it is also possible that the recording/reproducing device in the present invention includes a second information generation unit for generating the second information by converting a bit rate of the first information to a bit rate other than the bit rate of the first information, wherein the information recording unit records the second information in the second recording area, the second information being generated by the second information generation unit, and the second information generation unit converts the bit rate of the first information to a bit rate corresponding to an available space, which is the space where additional recording is possible, in the second recording area.

In addition, it is also possible that the recording/reproducing device in the present invention includes a second recording area confirmation unit for confirming whether or not the second information is recorded in the second recording area, wherein the second recording area confirmation unit makes the validation unit validate the second information in the case of confirming that the second information is recorded in the second recording area.

In addition, it is also possible that the recording/reproducing device in the present invention includes: a size detection unit for detecting size of the second information; and a comparison unit for comparing the size of the second information detected by the size detection unit with an available space, which is the space where additional recording is possible, in the second recording area, wherein the information recording unit records the second information in the second recording area in the case where the size of the second information is equal to or less than the available space as a result of the comparison performed by the comparison unit.

In addition, it is also possible that the recording/reproducing device in the present invention includes: a size detection unit for detecting size of the first information; a comparison unit for comparing the size of the first information detected by the size detection unit with an available space, which is the space where additional recording is possible, in the second recording area; and a second information generation unit for generating the second information by converting a format or a bit rate of the first information to a different format or bit rate so as to make the size of the second information equal to or less than the available space in the case where the size of the first information exceeds the available space as a result of the comparison performed by the comparison unit, wherein the information recording unit records the second information in the second recording area, the second information being generated by the second information generation unit.

In addition, it is also possible that the recording/reproducing device in the present invention includes a reproduction disabling unit for disabling reproduction of the first information in the case where the receiving unit receives the recording instruction.

In addition, it is also possible that, in the recording/reproducing device in the present invention, the first recording area is a first recording medium, and the second recording area is a second recording medium, and the recording/reproducing device in the present invention further includes: a first holding unit which holds the first recording medium; a second holding unit which holds the second recording medium; an ejection instruction detection unit for detecting an ejection instruction requesting to eject the second recording medium from the second holding unit to the outside of the recording and reproducing device; a reproduction disabling unit for disabling reproduction of the second information which is recorded in the second recording medium and is invalidated, in the case where the ejection instruction detection unit detects the ejection instruction; and an ejection unit for ejecting the second recording medium from the second holding unit to the outside of the recording and reproducing device, after the reproduction disabling unit disables reproduction of the second information. Furthermore, it is also possible to include a recording confirmation unit for confirming with a user whether or not the first information corresponding to the second information recorded in the second recording medium and invalidated is recorded in the second recording medium in the case where the ejection instruction detection unit detects the ejection instruction, wherein the reproduction disabling unit disables reproduction of the first information in the case where the recording confirmation unit confirms that the first information is to be recorded in the second recording medium, and disables reproduction of the second information in the case where the recording confirmation unit confirms that the first information is not to be recorded in the second recording medium, and the ejection unit ejects the second recording medium from the second holding unit to the outside of the recording and reproducing device after the reproduction disabling unit disables reproduction of the first information or the second information. In addition, it is also possible to include a processing detail recording unit for recording details of processing so that the reproduction disabling unit disables reproduction of the second information; and a reproduction enabling unit for enabling, based on the details of the processing, reproduction of the second information in which reproduction is disabled, after the second recording medium which is ejected by the ejection unit is held by the second holding unit again.

In addition, it is also possible that, in the recording/reproducing device in the present invention, the first recording area and the second recording area are present in a recording medium, and the recording and reproducing device further includes: a holding unit which holds the recording medium; an ejection instruction detection unit for detecting an ejection instruction requesting to eject the recording medium from the holding unit to the outside of the recording and reproducing device; a reproduction disabling unit for disabling reproduction of the second information which is recorded in the recording medium and is invalidated, in the case where the ejection instruction detection unit detects the ejection instruction; and an ejection unit for ejecting the recording medium from the holding unit to the outside of the recording and reproducing device, after the reproduction disabling unit disables reproduction of the second information. Furthermore, it is also possible that a format or a bit rate of the first information is different from a format or a bit rate of the second information, and the recording and reproducing device further includes a recording confirmation unit for confirming whether or not the first information corresponding to the second information recorded in the recording medium and invalidated is converted to the same format or bit rate as the second information, in the case where the ejection instruction detection unit detects the ejection instruction, wherein the reproduction disabling unit disables reproduction of the first information in the case where the recording confirmation unit confirms that the first information is to be converted to the same format or bit rate as the second information, and disables reproduction of the second information in the case where the recording confirmation unit confirms that the first information is not to be converted to the same format or bit rate as the second information, and the ejection unit ejects the recording medium from the holding unit to the outside of the recording and reproducing device, after the reproduction disabling unit disables reproduction of the first information or the second information. In addition, it is also possible to include a processing detail recording unit for recording details of processing so that the reproduction disabling unit disables reproduction of the second information; and a reproduction enabling unit for enabling, based on the details of processing, reproduction of the second information in which reproduction is disabled, after the recording medium which is ejected by the ejection unit is held by the holding unit again.

In addition, it is also possible that the recording/reproducing device in the present invention includes: an obtainment step of obtaining first information; an information recording step of recording the first information in a first recording area and recording second information in a second recording area, the first information being obtained by the obtainment step, and the second information having the same content as the first information; an invalidation step of invalidating the second information; a receiving step of receiving an instruction requesting the first information recorded in the first recording area to be recorded in the second recording area; and a validation step of validating the invalidated second information in the case where the instruction is received by the receiving step.

Moreover, the present invention can be realized: as a method having the characteristic units of the recording/reproducing device of the present invention as steps; as a program including such steps; as a recording medium, such as a CD-ROM, in which the program is stored; and as an integrated circuit. Such program can be distributed via a transmission medium, such as a communication network.

Effects of the Invention

According to the recording/reproducing device of the present invention, when first information is recorded in a first recording area, second information having the same content as the first information is recorded in a second recording area. In addition, the second information is invalidated. Thus, the user can only recognize that the first information is recorded in the first recording area.

However, in the case where an instruction requesting the first information recorded in the first recording area to be recorded in the second recording area, in other words, an instruction requesting to perform dubbing of the first information is received, the dubbing is completed by validating the second information, without copying the substantive data.

In other words, it is possible to complete dubbing instantly by recording, simultaneously and in advance, information having the same content as the information to be dubbed. In addition, by invalidating and validating information, it is possible to set access limits against a user and to maintain copyright protection suited for various media.

Thus, the present invention can provide a recording/reproducing device that shortens time required for dubbing, when a user performs the dubbing of information.

BRIEF DESCRIPTION OF DRAWINGS

FIG. 12 is a diagram showing an example of a dubbing confirmation screen for instructing a user to perform dubbing from the HDD to the optical disc.

NUMERICAL REFERENCES

Figure 1:
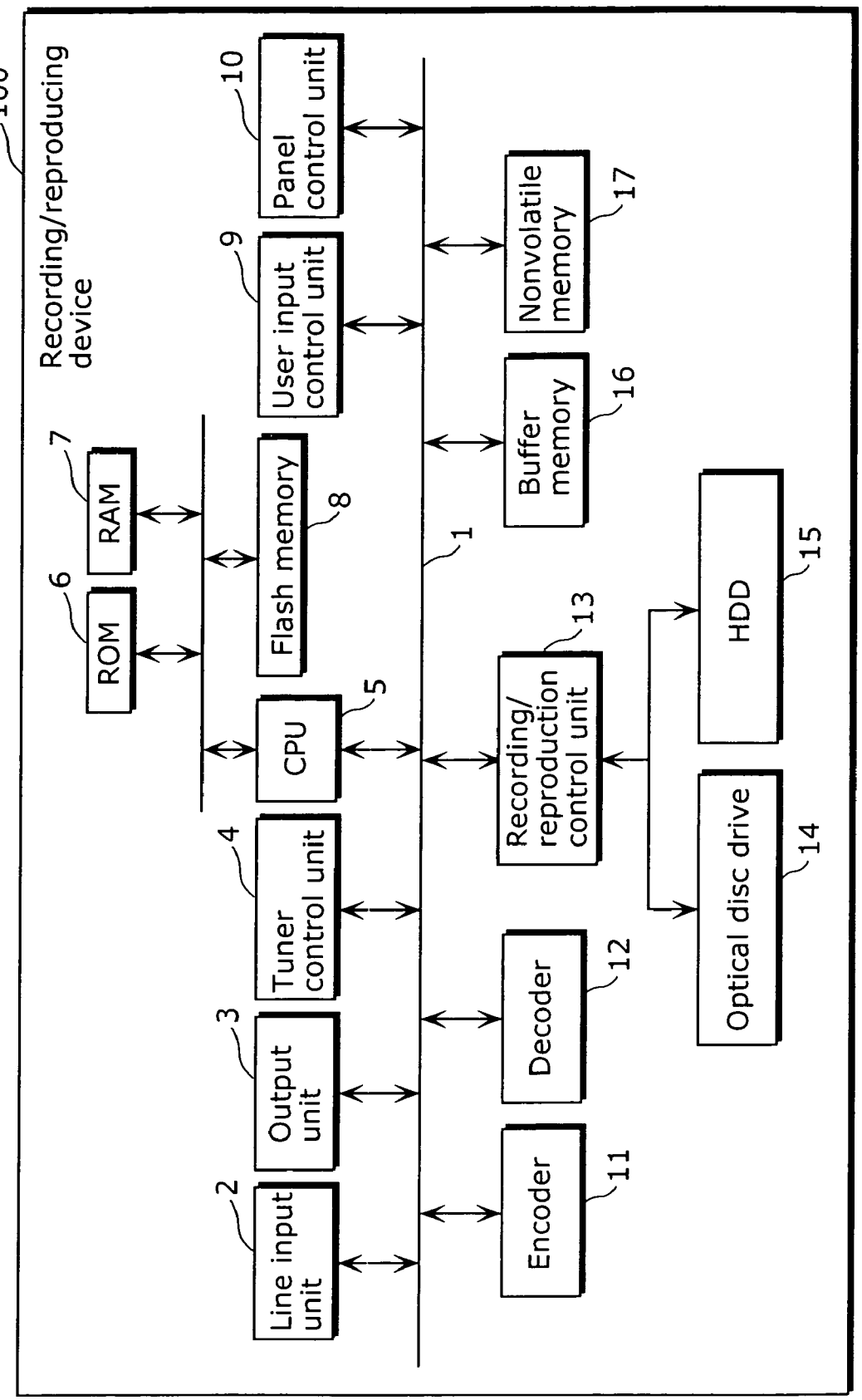
FIG. 1 is a diagram showing an example of the structure of the recording/reproducing device in the first and third embodiments.

1 Bus
2 Line input unit
3 Output unit
4 Tuner control unit
5 CPU
6 ROM
7 RAM
8 Flash memory
9 User input control unit
10 Panel control unit
11 Encoder
12 Decoder
13 Recording/reproduction control unit
14 Optical disc drive
15 HDD
16 Buffer memory
17 Nonvolatile memory
100 Recording/reproducing device
301, 701 Recording history information
302, 702 Program data information
303 Title name
304 Channel
305 Recording date
306 Recording mode
307 Total time
308 Recording device
309 Copy device
703 Attribute

BEST MODE FOR CARRYING OUT THE INVENTION

The embodiments of the present invention are described hereinafter with reference to the diagrams.

First Embodiment

As the first embodiment of the present invention, a recording/reproducing device having two recording media, namely an HDD and an optical disc is described. With this recording/reproducing device, for example, when program data is recorded in the HDD and then dubbed to the optical disc, it is possible to be dubbed in a short time.

FIG. 1 is a diagram showing an example of the structure of the recording/reproducing device 100 in the first embodiment.

A line input unit 2 is, for example, a processing unit which uses transmission lines for video and audio such as a RGB cable, and receives input from an external device. An output unit 3 is a processing unit which outputs video and audio to an external device. A tuner control unit 4 is a processing unit which receives broadcast wave and demodulates information of video and audio.

A user input control unit 9 is, for example, a processing unit which receives a signal from a remote control. A panel control unit 10 is a processing unit which performs control of displaying an operating status of the recording/reproducing device 100 on a panel display device, such as an FL tube. Moreover, the user input control unit 9 is an example of a receiving unit in the recording/reproducing device of the present invention. In addition, the line input unit 2 and the tuner control unit 4 is an example of an obtainment unit in the recording/reproducing device of the present invention.

An encoder 11 is a processing unit which modulates program data into a format such as the MPEG2-TS and MPEG2-PS. A decoder 12 is a processing unit which demodulates the program data of the MPEG2-TS and MPEG2-PS. With the encoder 11 and the decoder 12, a function, provided in a second information generation unit of the recording/reproducing device of the present invention, is realized which converts the format or bit rate of the first information and generates the second information.

A recording/reproduction control unit 13 is a processing unit which controls an optical disc drive 14 that records/reproduces data in the optical disc, and an HDD 15. The recording/reproduction control unit 13 can execute functions provided in an information recording unit, a reproduction disabling unit and a reproduction enabling unit in the recording/reproducing device of the present invention by controlling the optical disc drive 14 and the HDD 15.

In addition, the hard disc held in the HDD 15 as well as the optical disc held in the optical disc drive 14 is an example of the first recording area and the second recording area in the recording/reproducing device of the present invention.

Buffer memory 16 is memory which temporarily stores program data, and nonvolatile memory 17 is memory which stores information that the recording/reproducing device 100 manages.

In addition, ROM 6, RAM 7, and flash memory 8 are provided in this recording/reproducing device 100, and a CPU 5 which is connected to these performs operation control of the whole recording/reproducing device 100. A program for the operation control is stored in at least one of the ROM 6, flash memory 8, and HDD 15. In addition, transmitting and receiving of program data and control information in each processing unit and between devices which are provided in the recording/reproducing device 100, is performed through a bus 1. Moreover, the RAM 7 is an example of a management data recording area in the recording/reproducing device of the present invention.

The outline of a program data flow in recording with this recording/reproducing device 100 is described. When broadcast wave is recorded, the encoder 11 modulates, where necessary, the program data obtained through the tuner control unit 4. In this case, a format to be modulated is determined, depending on a recording medium which a user designates. For example, when recorded in the DVD-RAM, the format is the MPEG2-PS.

In addition, where necessary, modulation is performed in accordance with the bit rate which is designated by the user and used for recording the program data. Specifically, the bit rate is determined for every format, depending on a "recording mode" designated by the user. For example, there are "XP", "SP", "LP", "EP" and "AUTO" as the recording modes, and the bit rate of each mode sequentially gets lower in an order of "XP", "SP", "LP", and "EP". In addition, the bit rate for "AUTO" is determined, depending on an available space in a recording medium to be a recording destination. The correspondence between a recording mode and the bit rate is held in the ROM 6 and the like.

In this manner, the program data modulated where necessary is transferred, through the recording/reproduction control unit 13, to the device corresponding to the recording medium designated by the user, and is recorded. For example, when the user designates the optical disc as a recording destination of the program data, the program data is transferred to the optical disc drive 14, and is recorded in the optical disc. In this way, the recording operation is performed.

The outline of the aforementioned recording operation is similar to a recording operation of a conventional recording/reproducing device. However, the recording/reproducing device 100 of the first embodiment can perform recording processing to shorten the time required for performing dubbing of program data from the HDD 15 to the optical disc.

Figure 2:
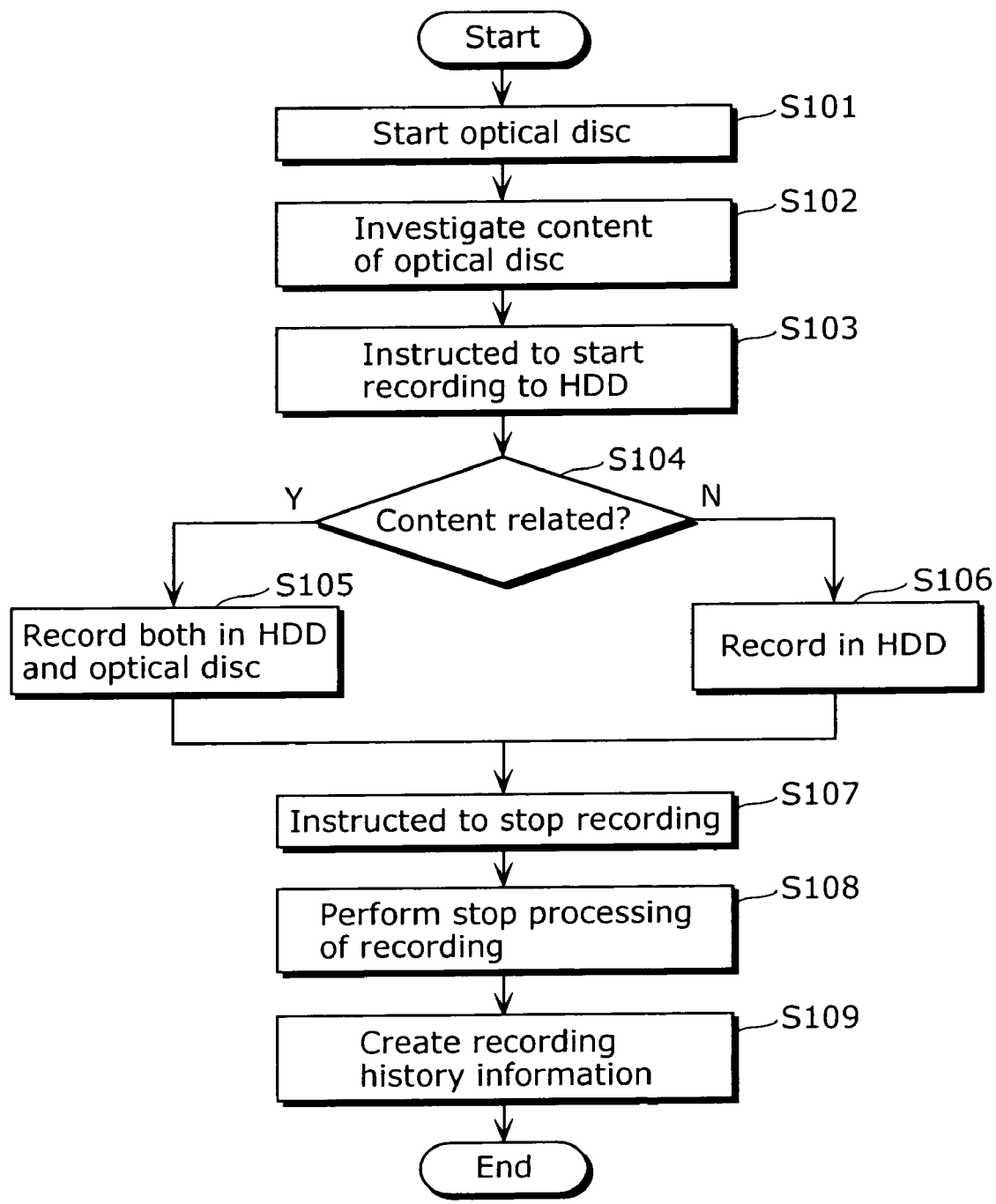
FIG. 2 is a flowchart showing an example of a flow of recording processing in the recording/reproducing device of the first embodiment.

FIG. 2 is a flowchart showing an example of a flow of recording processing in the recording/reproducing device 100 of the first embodiment. Moreover, operation of each processing unit described hereinafter is, unless otherwise designated, performed by control of the CPU 5 based on a program stored in the ROM 6 and the like. In addition, it is assumed that plural sets of program data are already recorded in the optical disc.

The recording/reproducing device 100 is started by predetermined operation of the user. After the startup, the optical disc held in the optical disc drive 14 is started (S101). After starting the optical disc, the content investigation of the program data recorded in the optical disc is performed (S102). Specifically, the recording/reproduction control unit 13 reads out information such as a title of the program data recorded in the optical disc. The read-out information is stored in the RAM 7.

Next, a start of recording to the HDD 15 is instructed by the remote control operation or panel operation of the user, or reserved recording information set beforehand (S103). When the recording starts, the content of the program data to be recorded is compared with the content of the program data in the optical disc which is obtained by the content investigation (S102), and it is judged whether or not they are related to each other (S104). In other words, it is judged whether or not the respective attribute information of the aforementioned program data have a predetermined relationship.

Specifically, information such as a title of the program data to be recorded is stored in the RAM 7, and the comparison with information which is read out from the optical disc that is stored in advance is performed by the CPU 5. In the present embodiment, in the case where the title names are identical, it is judged that the content of the program data to be recorded is related to the content of the program data recorded in the optical disc. In other words, the CPU 5 executes a judgment function provided in a judgment unit in the recording/reproducing device of the present invention.

Here, in the case where it is judged that the contents are related to each other ("Y" at S104), it indicates that program data having the same title as a title of the program data to be recorded in the HDD 15 is already recorded in the optical disc. In this case, the program data to be recorded is, for example, data of the program having the same title every time, such as a serial drama, and it is assumed that the program data up to the previous broadcast is already dubbed from the HDD 15 to the optical disc. Thus, it is highly possible to assume that the program to be recorded in the HDD 15 is dubbed to the optical disc after recorded in the HDD 15.

Thus, the recording/reproducing device 100 of the first embodiment simultaneously records the same program data in both the HDD 15 and the optical disc. It should be noted that the program data to be recorded in the HDD 15 is an example of the first information in the recording/reproducing device of the present invention, and the program data to be recorded in the optical disc is an example of the second information in the recording/reproducing device of the present invention.

Specifically, in the case where it is judged that the content of the program data to be recorded and the content of the program data recorded in the optical disc are related to each other ("Y" at S104), the same program data is recorded in both the HDD 15 and the optical disc by control of the recording/reproduction control unit 13 (S105). Moreover, in the case where it is judged that there is no relationship in the contents ("N" at S104), the program data is recorded only in the HDD 15 by control of the recording/reproduction control unit 13 (S106).

Next, in accordance with a stop instruction of recording (S107), the units such as the recording/reproduction control unit 13 perform stop processing of recording (S108). After stopping the recording, by operation of the CPU 5, the program data information which is information regarding the recorded program is created, stored in the RAM 7, and added to the recording history information (S109).

Here, at the time of this recording, the program data has only to be recorded in the HDD 15 from the user's point of view. Therefore, as described above, in the case where the same program data is recorded in both the HDD 15 and the optical disc, it is necessary to put, in a state where the user does not recognize, the program data recorded in the optical disc, so as not to confuse the user.

In addition, as described above, in the case where program data is designated as "one generation copy available", two sets of the same program data must not be in a state where reproduction and editing can be performed simultaneously. For this reason, it is necessary to put, in a state where the user can not access, the program data recorded in the optical disc. This is because when the user can not access the program data, it is natural that the user can neither perform the reproduction and editing, nor recognize it.

Thus, in the case where the two sets of the same program data are recorded in the recording/reproducing device 100, using the recording history information, only either set of the program data is put in a state where the user can access it. In the present embodiment, only the program data recorded in the HDD 15, which is explicitly designated by the user as a recording destination of the program data, is put in a state where the user can access it. This enables the user not to be confused, and copyright of the program data to be protected.

Figure 3:
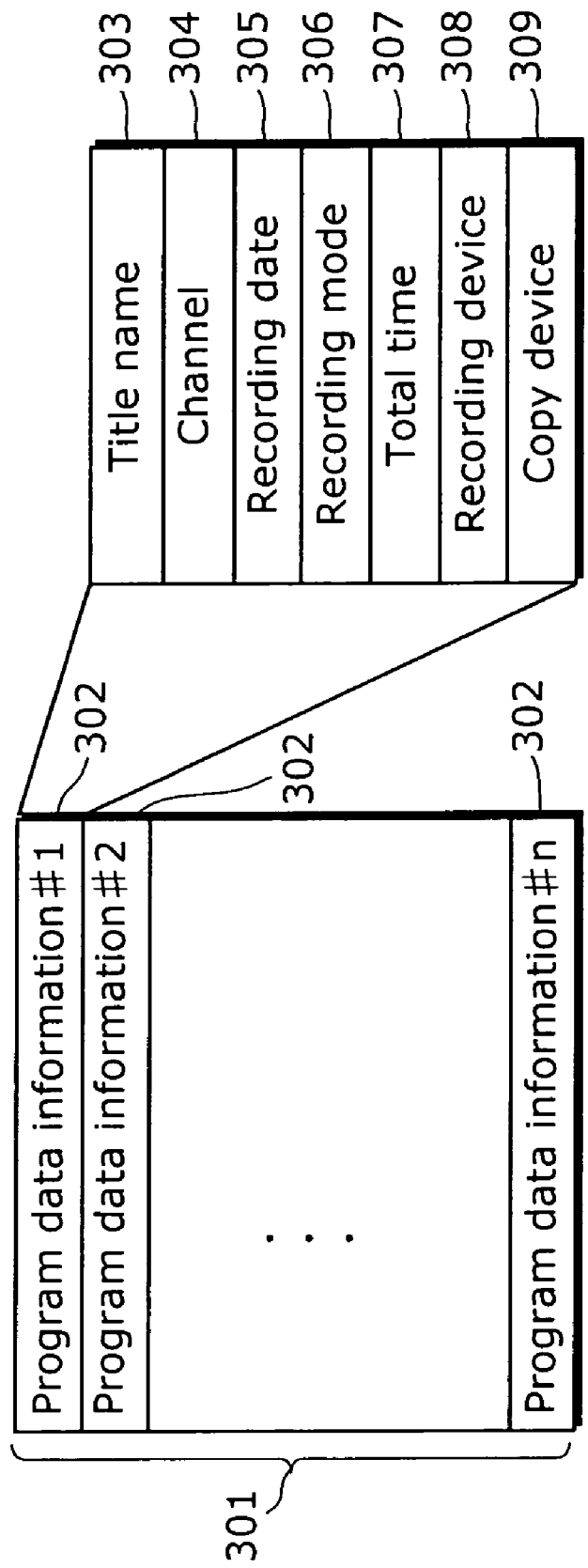
FIG. 3 is a diagram showing an example of data structure of the recording history information and the program data information in the first embodiment.

FIG. 3 is a diagram showing an example of data structure of the recording history information 301 and of the program data information 302 included in the recording history information 301.

The recording history information 301 is made up of n sets of the program data information 302. "N" is an integer larger than 1, and indicates that the recording history information 301 is made up of a plurality of the program data information 302. In addition, the number # 1, # 2, - - - , and # n which are allocated to the respective program data information 302 are the numbers allocated for the sake of convenience.

Each of the program data information 302 includes, as the data items: a title name 303; a channel 304 on which the program data is broadcasted; a recording date and time 305 which is the date and time when the program data is recorded; a recording mode 306 which shows a format and bit rate of the program data; total time 307 which shows total time of the program data; a recording device 308 which is information concerning a device which records the program data by instruction of the user; and a copy device 309 which is information concerning a device which simultaneously records the program data regardless of the instruction of the user.

In the first embodiment, information for identifying the HDD 15 is recorded in the recording device 308. In addition, unique identification information (hereinafter referred to as "disc ID") of the optical disc in which the same program data as the program data recorded in the HDD 15 is recorded, and the recording mode of the program data and the like recorded in the optical disc is recorded in the copy device 309. It should be noted that there may be plural copy devices.

In the recording/reproducing device 100, as described above, when the same program data is simultaneously recorded in the HDD 15 and the optical disc (S105), the program data recorded in the optical disc can not be accessed by the user by recording information such as the disc ID in the copy device 309.

Specifically, when it is necessary to output, with instruction from the user, the program data recorded in the optical disc and information such as the title to the outside, the recording/reproduction control unit 13 reads out the disc ID of the optical disc. The CPU 5 identifies, from the recording history information 301, the program data information 302 having the read-out disc ID in the copy device 309. Furthermore, the CPU 5 controls the recording/reproduction control unit 13, the output unit 3 and the panel control unit 10 so as not to output, from the recording/reproducing device 100 to the outside, information, such as the program data and its title which are indicated by the identified program data information 302.

With this, for example, when a list of titles of the program data recorded in the optical disc is outputted with instruction of the user, the title of the program data recorded in the optical disc at the same time when the title is recorded in the HDD 15 is not outputted. In other words, the user does not have any means to recognize the program data which is present in the optical disc. Because of this, the user cannot access the program data.

Moreover, regarding the program data recorded only in the HDD 15, nothing is recorded in the copy device 309 of the corresponding program data information 302. Therefore, the user can access the program data and use the functions such as reproduction.

Thus, whether or not the program data can be accessed by the user is determined, depending on the content included in the program data information 302. Hereinafter, using the program data information 302, preventing the user from accessing the program data is referred to as invalidation, and enabling the user to access the invalidated program data in the recording/reproducing device 100 is referred to as validation.

Moreover, the recording history information 301 and the program data information 302 are examples of management data in the recording/reproducing device of the present invention, and a recording function provided in a management data recording unit is realized by the CPU 5. In addition, a validation function and an invalidation function for information respectively provided in a validation unit and an invalidation unit in the recording/reproducing device of the present invention are realized by the CPU 5.

Moreover, when the predetermined operation of the user puts the recording/reproducing device 100 in a stop state, the recording history information 301 stored in the RAM 7 is read into the nonvolatile memory 17. Next, when the recording/reproducing device 100 is started, the recording history information 301 is read from the nonvolatile memory 17 into the RAM 7.

In this manner, the recording/reproducing device 100 of the first embodiment simultaneously records the same program data in both the HDD 15 and the optical disc held in the optical disc drive 14.

Figure 4:
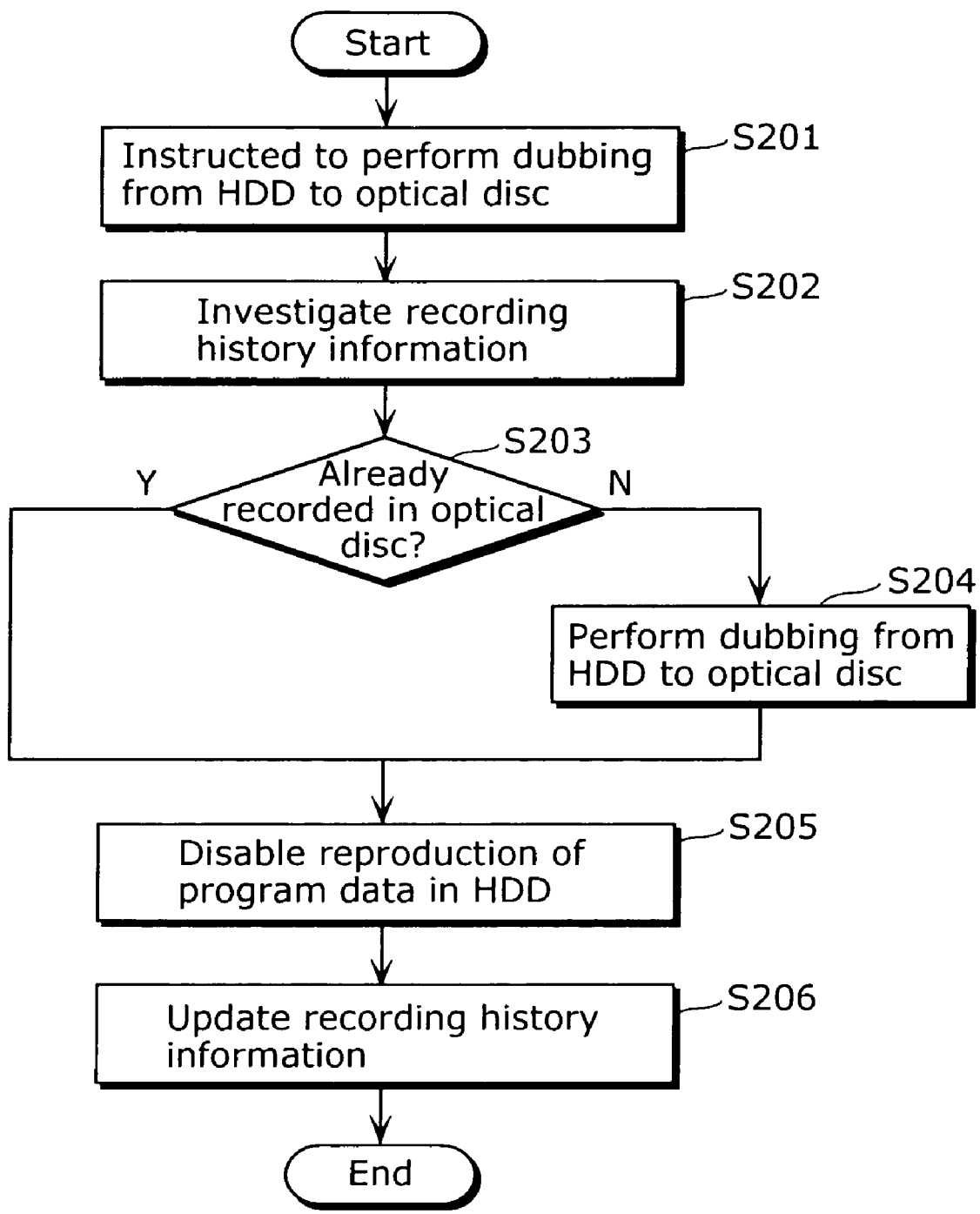
FIG. 4 is a flowchart showing an example of a flow of dubbing processing in the recording/reproducing device of the first embodiment.

The operation of the recording/reproducing device 100 is described using FIG. 4 in the case where the user performs dubbing of the program data recorded in the HDD 15 to the optical disc.

FIG. 4 is a flowchart showing an example of a flow of dubbing processing in the recording/reproducing device 100 of the first embodiment.

With the predetermined operation of the user, an instruction is provided with which the program data recorded in the HDD 15 is dubbed to the optical disc held in the optical disc drive 14 (S201). Upon receipt of the dubbing instruction, whether or not the designated program data is recorded in advance in the optical disc is investigated in the recording/reproducing device 100, using the recording history information (S202).

Specifically, the CPU 5 extracts, from the recording history information stored in the RAM 7, program data information in the program data to be dubbed. In addition, the CPU 5 makes the recording/reproduction control unit 13 read out the disc ID of the optical disc. Furthermore, whether or not the disc ID that the recording/reproduction control unit 13 reads out is recorded in the item of the copy device 309 in the extracted program data information is confirmed. When the disc ID is recorded, it indicates that the program data to be dubbed is recorded in the optical disc. In this manner, the CPU 5 realizes a confirmation function provided in a second recording area confirmation unit of the recording device of the present invention.

In the case where the program data to be dubbed is recorded in the optical disc ("Y" at S203), without performing substantive dubbing processing, reproduction of the program data to be dubbed to the HDD 15 is disabled (S205). Reproduction of the program data is disabled by making the recording/reproduction control unit 13 control the HDD 15. In other words, the recording/reproduction control unit 13 realizes a reproduction disabling function for information provided in the reproduction disabling unit in the recording/reproducing device of the present invention.

Moreover, in the description of the recording/reproducing device of the present invention, reproduction disabling is to completely delete program data itself, or to substantially disable reproduction of the program data by deleting or processing management information that is information, provided in the recording medium in which the program data is recorded, which manages information within the recording medium. In addition, information of the program data in which reproduction is disabled, such as the title and the like is not read out, and the processing such as copying and editing becomes impossible. The area where the program data in which reproduction is disabled is present is recognized as an available space area in the recording medium.

After disabling reproduction of the program data, the recording history information is updated (S206). Specifically, the disc ID of the optical disc is recorded in the item of the recording device, and the content of the copy device of the recording history information is deleted. With this, the program data to be dubbed which is recorded in the optical disc is validated.

Following the aforementioned operation, the dubbing is completed. In this manner, in the case where the user instructs the recording/reproducing device 100 of the first embodiment to perform dubbing of program data from the HDD 15 to the optical disc, there is no need to perform the substantive dubbing processing, in other words, copy processing including read and write of the program data.

Moreover, in the case where the program data to be dubbed is not recorded in the optical disc ("N" at S203) due to reasons such as that no optical disc is loaded in the optical disc drive 14, when the program data is recorded in the HDD 15, the substantive dubbing processing is performed from the HDD 15 to the optical disc (S204).

Here, an example of a flow of the substantive dubbing processing in the recording/reproducing device 100 is described. The recording/reproduction control unit 13 temporarily stores, in a buffer memory 16, the program data which is read out from the HDD 15. Next, the recording/reproduction control unit 13 performs processing control to make the optical disc drive 14 record, in the optical disc, the program data stored in the buffer memory 16.

After the substantive dubbing processing, reproduction of the program data in the HDD 15 is disabled (S205), and the recording history information is updated (S206).

In this manner, when the recording/reproducing device 100 of the first embodiment is instructed by the user to record the program data in the HDD 15, it is possible not only to record the program data in the HDD 15, but also to simultaneously record the program data in the optical disc held in the optical disc drive 14. Based on the recording history information, the program data, the title and the like recorded in this optical disc are controlled so as not to be accessed by the user.

Next, when the user instructs to record, in the optical disc, the program data recorded in the HDD 15, in other words when a dubbing instruction is provided, the program data which is already recorded in the optical disc is validated by rewriting the recording history information. In addition, at the same time, reproduction of the program data in the HDD 15 is disabled.

In other words, the recording/reproducing device 100 can provide the user with the same result as the substantive dubbing in a short time without performing the substantive dubbing processing. In addition, from the user's point of view, the program data which can be accessed by the user is moved from the HDD 15 to the optical disc before and after the dubbing. With this, even when the same program data is actually present in the HDD 15 and the optical disc, it does not confuse the user. In addition, even when the program data has a limitation on copying for copyright protection, the dubbing is performed by observing the limitation.

Moreover, as a method for disabling reproduction of the program data recorded in the HDD 15, adopting not a method by which the program data is completely deleted but a processing method so as not to access the management information concerning the program data or a processing method so as not to access the program data is effective, when the program data dubbed to the optical disc is dubbed again in the HDD 15.

For example, the processing details of the aforementioned program data and the management information are stored as the processing history in the nonvolatile memory 17. In the case where re-dubbing from the optical disc to the HDD 15 is instructed, based on the processing history, the program data or management information is returned to the state before performing the processing of the program data or management information and the like so that the program data can be watched. In other words, reproduction of the program data is enabled. In addition, the program data to be dubbed, which is recorded in the optical disc is invalidated.

With this, in the case where the program data dubbed to the optical disc is re-dubbed to the HDD 15, the re-dubbing is completed in a short time without requiring the substantive dubbing processing.

In addition, not reproduction of the program data recorded in the HDD 15 may be disabled, but the program data recorded in the HDD 15 may be invalidated. Even with this, the program data dubbed to the optical disc can be dubbed again to the HDD 15.

For example, by transferring information of the program data of the HDD 15 to the copy device 309 of the recording history information, the program data of the HDD 15 is invalidated. In the case where re-dubbing from the optical disc to the HDD 15 is instructed, information of the copy device in the recording history information is copied in the program data information, and information of the optical disc is transferred to the copy device. In this manner, the program data of the HDD 15 is validated, and the program data of the optical disc is invalidated. With this, in the case where the program data temporarily dubbed to the optical disc is re-dubbed to the HDD 15, without requiring the substantive dubbing processing, the re-dubbing is completed in a short time.

In addition, as shown in the flowchart of FIG. 2, in the description of an example of a flow of the recording processing in the recording/reproducing device 100, when the title of the program data to be recorded matches the title name of the program data recorded in the optical disc, it is judged that the content of the program data to be recorded is related to the content of the program data recorded in the optical disc.

However, whether or not the contents of such program data are related to each other may be judged by whether or not the respective attribute information other than the titles are identical. For example, whether or not the respective broadcast day, the broadcast day of the week, or time when such program data is broadcasted are identical may be used for the judgment. In addition, the judgment may be made by a plurality of information, for example, whether or not both two sets of information, namely, the title and broadcast time, or part of the information are identical.

In other words, an optimal judgment method for identifying a relationship between the content of the program data to be recorded and the content of the program data recorded in the optical disc has only to be determined.

In addition, only in the case where it is judged that there is a relationship between the content of the program data to be recorded and the content of the program data recorded in the optical disc, the program data is recorded in both the HDD 15 and the optical disc. However, for example, the program data may be recorded in both media, regardless of the relationship in the content of the respective programs. In addition, in the case where the contents of the program are related to each other but the size of the program data to be recorded exceeds the available space of the optical disc, the format or bit rate of the program data to be recorded in the HDD 15 may be converted, depending on the available space of the optical disc.

This process can increase an opportunity to record, simultaneously in the optical disc, the program data to be recorded in the HDD 15. With this, when the user desires dubbing of the program data, an opportunity of dubbing in a short time increases, and convenience of the recording/reproducing device 100 is improved for the user.

In addition, in dubbing, reproduction of the program data present in the HDD 15 which is the source in dubbing is disabled. However, the reproduction need not to be disabled. For example, in the case where program data to be dubbed is the program data in which the user has copyright, such as the case where the video image is taken by the user, the program data may remain in the HDD 15 even after the dubbing. In addition, for example, whether or not reproduction is disabled may be determined by obtaining information concerning copyright from the program data to be dubbed.

In addition, in the description of the first embodiment, the program data to be recorded in the HDD 15 and in the optical disc is the same program data. However, when the program data includes the same content, the format and the like may be different. For example, the program data may be modulated and recorded in the optical disc. In addition, for example, in the case where the format of the program data which the tuner control unit 4 receives is the MPEG2-TS, and in the case where the optical disc is a DVD-RAM, the program data may be recorded in the HDD 15 with the MPEG2-TS format, and it may be recorded in the DVD-RAM by modulating the data into the MPEG2-PS format. In other words, the program data has only to be recorded in a format suited for the recording medium.

In addition, the program data may be invalidated and validated without using the program data information 302. For example, the same method may be used as the aforementioned disabling and enabling reproduction. In addition, it may be realized by the encryption and decryption technology. Furthermore, these methods may be used by combining with a method which uses the program data information.

In addition, the management information of the program data is recorded in the optical disc when the program data is recorded (S105 in FIG. 2). Thus, for example, when the program data is recorded in the optical disc, it may be invalidated by not recording the management information of the program data in the optical disc. In addition, in the case where the program data invalidated by this method becomes an object for dubbing ("Y" at S203), the management information of the program data is recorded in the optical disc without performing the substantive dubbing processing. Such information is read out from the management information retracted to the HDD 15 and the like without recording it in the optical disc, the management information of the program data in the HDD 15, the recording history information or the like. With this, the program data of the optical disc is validated. On the other hand, invalidation is performed by deleting the management information of the program data in the HDD 15 or transferring it to such as the optical disc and the flash memory 8.

In this manner, invalidation and validation of program data has only to be the technology with which the user can access, in a short time, the program data which can not be accessed by the user.

In addition, timing when the program data recorded in the optical disc is invalidated, in other words, timing when the recording history information is created, need not to be the timing shown in FIG. 3. For example, the timing may be before the optical disc is recorded in the program data and during the time when the program data is being recorded in the optical disc.

In addition, the recording history information 301 shown in FIG. 3 is stored in the nonvolatile memory 17 when the power of the recording/reproducing device 100 is turned off. However, storage area of the recording history information 301 may be the flash memory 8, optical disc, HDD 15 or the like. In other words, even when the power of the recording/reproducing device 100 is turned off, the storage area of the recording history information 301 has only to be the recording medium which can hold data.

In addition, the copy device 309 which is an information item included in the program data information 302 need not to be limited to one. For example, in the case where the program data is recorded simultaneously in a plurality of devices, a plurality of the copy device 309 may be provided in order to record information which identifies the plurality of devices.

In addition, in the case where the respective bit rate and format of the program data recorded in the recording device 308 and the copy device 309 are different, the recording mode 306 may be provided so as to correspond with the recording device 308 and the copy device 309 separately.

In addition, the data structure of the program data information 302 need not to be the one shown in FIG. 3. For example, the data information may include such as the content of a program, a performer, genre information, and accounting information.

In this manner, the program data information 302 may be made up of any structures as long as necessary information can be held in it in accordance with the structure of the recording/reproducing device 100 or a request of the user.

In addition, the recording/reproducing device 100 of the first embodiment includes a pair of the HDD 15 and the optical disc as recording media, but not limited to these. For example, the pair may be a pair of HDDs, a pair of optical discs, or a pair of an optical disc and a semiconductor memory card and the like.

In addition, the recording/reproducing device 100 of the first embodiment performs dubbing from the HDD 15 to the optical disc, but the dubbing is not limited to such. For example, the dubbing may be performed from the optical disc to the HDD 15.

In other words, the operation, concerning recording and dubbing of the program data, which is performed in the recording/reproducing device 100 of the first embodiment is characterized by the ability to be executed, independent of a type of the recording medium.

In addition, part of or all of the units in the recording/reproducing device 100 shown in FIG. 1 are realized as an LSI that is an integrated circuit, by combination of each unit. These may be made into a separate single chip, or part of or all of units may be made into a single chip.

Figure 5:
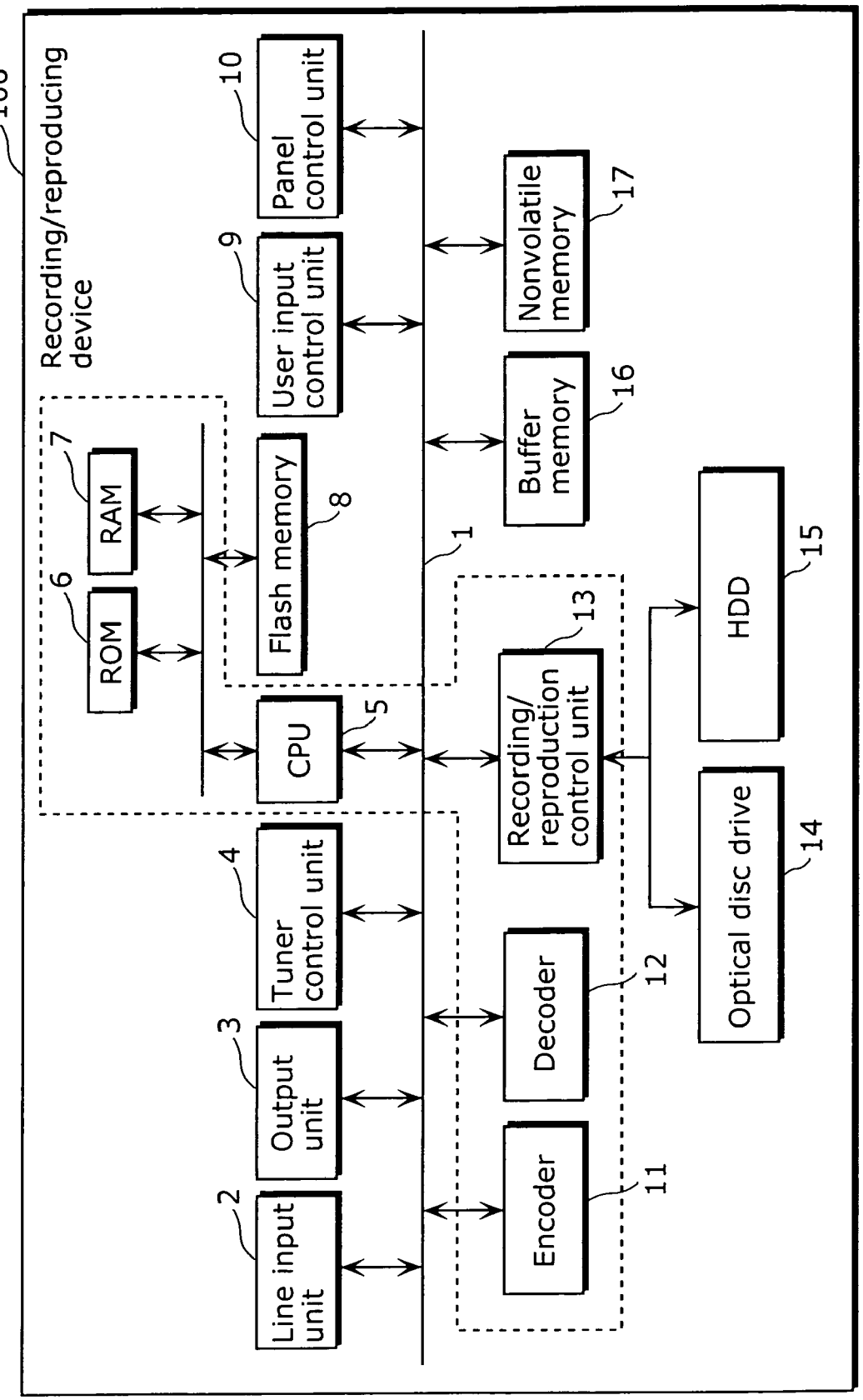
FIG. 5 is a diagram showing an example of range of the units realized as an integrated circuit in the recording/reproducing device of the first embodiment.

FIG. 5 is a diagram showing an example of range of the units realized as an integrated circuit in the recording/reproducing device 100 of the first embodiment. The range enclosed by a doted line in the diagram shows an example of the range of the units realized as an integrated circuit. In other words, the recording/reproducing device of the present invention may be realized as an integrated circuit such as an LSI.

Second Embodiment

As the second embodiment of the present invention, the recording/reproducing device having only one optical disc as a recording medium is described. When this recording/reproducing device performs, within the same disc, conversion dubbing of program data recorded in the optical disc, it is possible to perform the dubbing in a short time.

The conversion dubbing is a type of dubbing, and is dubbing requiring at least one of conversions, namely a format conversion and a bit rate conversion of the program data. For example, in the case where a bit rate of the program data recorded in the optical disc is converted, read-out of the program data is temporarily performed from the optical disc, and the read-out data is converted to the desired bit rate. Furthermore, the conversion is performed by recording, in the optical disc, the program data in which the bit rate is converted.

Figure 6:
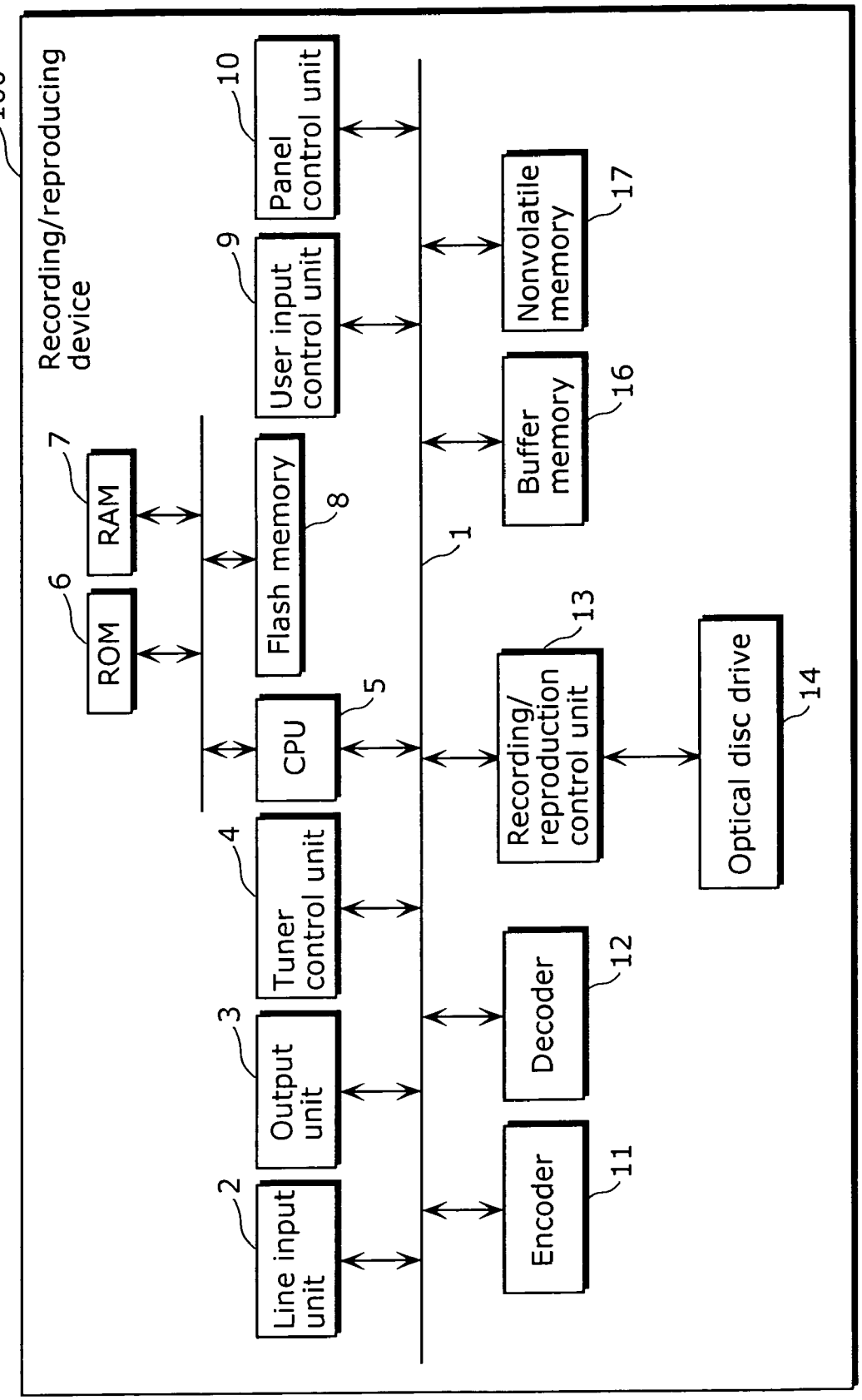
FIG. 6 is a diagram showing an example of structure of the recording/reproducing device of the second embodiment.

FIG. 6 is a diagram showing an example of structure of the recording/reproducing device 100 of the second embodiment.

As shown in FIG. 6, the recording/reproducing device 100 of the second embodiment is different from the recording/reproducing device 100 of the first embodiment shown in FIG. 1 in that the device in the second embodiment does not include the HDD 15 in the structure. However, except the HDD 15, the units provided in the second embodiment are the same as the ones provided in the recording/reproducing device 100 of the first embodiment. Therefore, the description of the structure of the recording/reproducing device 100 is omitted, and operation of the recording/reproducing device 100 of the second embodiment is described hereinafter.

Figure 7:
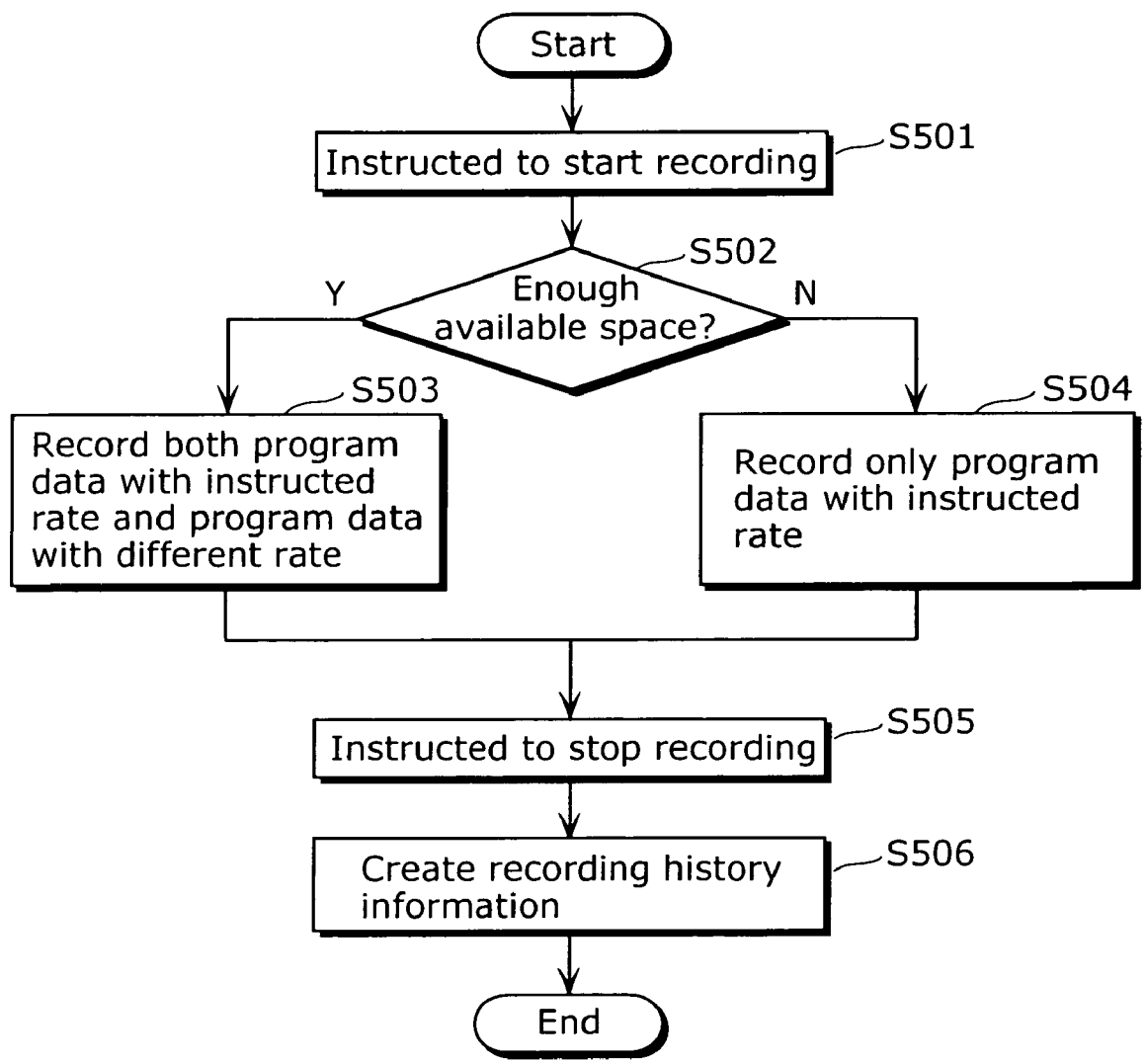
FIG. 7 is a flowchart showing an example of a flow of recording processing in the recording/reproducing device of the second embodiment.

FIG. 7 is a flowchart showing an example of a flow of recording processing in the recording/reproducing device 100 of the second embodiment. It should be noted that the operation of each processing unit shown hereinafter is performed, unless otherwise designated, by control of the CPU 5 based on a program stored in the ROM 6 and the like.

Recording of the program in the optical disc is started by the remote control operation or panel operation of the user or reserved recording information set beforehand (S501). When the recording is started, the recording/reproduction control unit 13 checks whether or not there is an available space to record, in the optical disc, both the program data recorded with the bit rate which is instructed by the user, and other data, for example, the program data recorded with the bit rate which is lower than the instructed bit rate (S502). In other words, a comparison is made whether or not the size of the program data with the bit rate which is different from the instruction is equal to or less than the amount of the available space after the program data with the bit rate instructed by the user is recorded in the optical disc. It should be noted that an available space is the space in which an additional recording is possible in the optical disc.

The CPU 5 performs detection of the size of the program data with the bit rate which is different from the instruction, and the aforementioned comparison.

In the case where there is an available space enough to record both the program data in the optical disc ("Y" at S502), by control of the recording/reproduction control unit 13, the program data with the bit rate instructed by the user and the program data with the different bit rate are recorded in the optical disc (S503). Although these two sets of the program data have the different bit rate each other, they are information having the same content.

On the other hand, in the case where there is not enough available space to record both the program data, but only to record the program data with the instructed bit rate ("N" at S502), by control of the recording/reproduction control unit 13, only the program data with the instructed bit rate is recorded in the optical disc (S504). After stop of recording is instructed (S505), the recording history information suited for the recorded program data is created by the operation of the CPU 5 (S506) and is stored in the RAM 7.

In a flow of the aforementioned operation, in the case where there is an available space in the optical disc enough to record both the program data ("Y" at S502), the recording history information is created so that only the program data recorded with the instructed bit rate can be accessed by the user, and so that the program data recorded with the bit rate which is different from the instruction can not be accessed by the user. In other words, the program data recorded with the bit rate which is different from the instruction is invalidated.

In addition, in the case where there is no available space to record both the program data ("N" at S502), the recording history information is created so that the recorded program can be accessed by the user.

Moreover, the program data recorded with the bit rate instructed by the user is hereinafter referred to as "first data". In addition, the program data which is recorded simultaneously with the first data and recorded with the bit rate other than the bit rate instructed by the user is hereinafter referred to as "second data".

Figure 8:
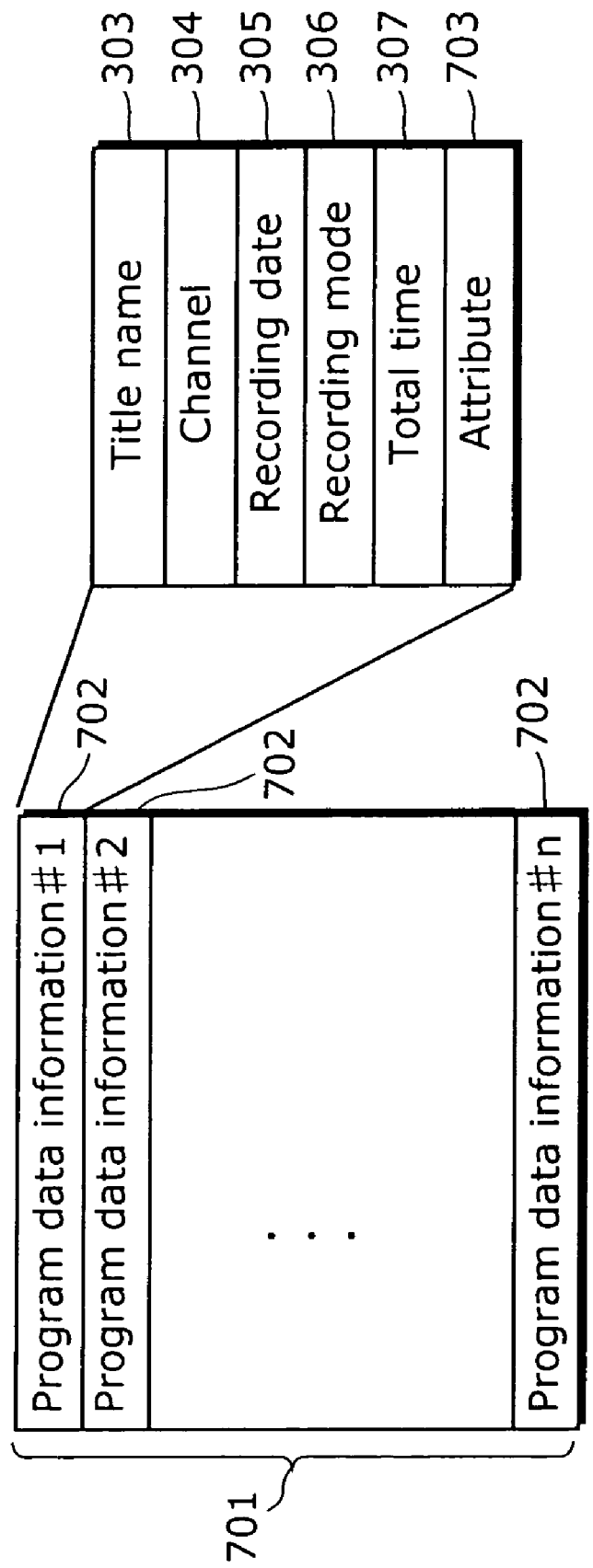
FIG. 8 is a diagram showing an example of data structure of the recording history information and the program data information of the second embodiment.

FIG. 8 is a diagram showing an example of data structure of the recording history information 701 and the program data information 702 included in the recording history information 701 which are generated and recorded in the recording/reproducing device 100 of the second embodiment.

The recording history information 701 is made up of n sets of the program data information 702. "N" is an integer larger than 1, and indicates that the recording history information 701 is made up of a plurality of the program data information 702. In addition, the number # 1, # 2, - - - , and # n which are allocated to the respective program data information 702 are the numbers allocated for the sake of convenience.

Each of the program data information 702 includes as the data items, likewise in the recording history information 301 of the first embodiment: the title name 303; the channel 304 on which the program data is broadcasted; the recording date and time 305 which is the time and date when the program data is recorded; the recording mode 306 which shows a format or bit rate of the program data; and total time 307 which shows total time of the program data.

In addition, each of the program data information 702 includes an attribute 703 in addition to the aforementioned data items.

The attribute 703 is a data item in which information showing whether or not the program data can be accessed by the user is recorded.

Specifically, in the case where the first data and the second data are simultaneously recorded in the optical disc, two sets of the program data information 702 corresponding to each program data are generated. Information which permits an access from the user is recorded in the attribute 703 of the program data information 702 corresponding to the first data. In addition, information which does not permit an access from the user is recorded in the attribute 703 of the program data information 702 corresponding to the second data. Furthermore, the disc ID of the optical disc is recorded in the respective attribute 703.

In addition, in the case where only the first data is recorded in the optical disc, a set of the program data information 702 is generated, and information which permits the user to access the first data is recorded in the attribute 703 of the program data information 702.

When it is necessary to output, with instruction of the user, the program data recorded in the optical disc and information such as the title to the outside, the recording/reproduction control unit 13 reads out the disc ID of the optical disc. The CPU 5 searches the recording history information 701 for the program data information 702 having the read-out disc ID in the attribute 703. Furthermore, as a result of the search, the recording/reproduction control unit 13, the output unit 3 and the panel control unit 10 are controlled so as not to output the program data indicating that an access is not permitted in the attribute 703 and so as to output the program data indicating that an access is permitted in the attribute 703, among a plurality of the program data 702 judged as applicable.

With this, for example, when a list of titles of the program data recorded in the optical disc is outputted by the instruction of the user, the second data is invalidated. In other words, the title of the program data recorded with the bit rate which is different from the instruction of the user is not outputted. In other words, the user does not have any means to recognize the program data which is present in the optical disc. Because of this, the user cannot access the program data.

Moreover, when the recording/reproducing device 100 is stopped by the predetermined operation of the user, the recording history information 701 stored in the RAM 7 is read into the nonvolatile memory 17. Next, when the recording/reproducing device 100 is started, the recording history information 701 is read into the RAM 7 from the nonvolatile memory 17. Moreover, it may be constantly read into the nonvolatile memory 17.

In this manner, the recording/reproducing device 100 of the second embodiment simultaneously records, in a single optical disc held in the optical disc drive 14, two sets of the program data having the same content. However, such two sets of the program data have the different bit rate each other, and the user can only access the program data with the bit rate instructed by the user.

Figure 9:
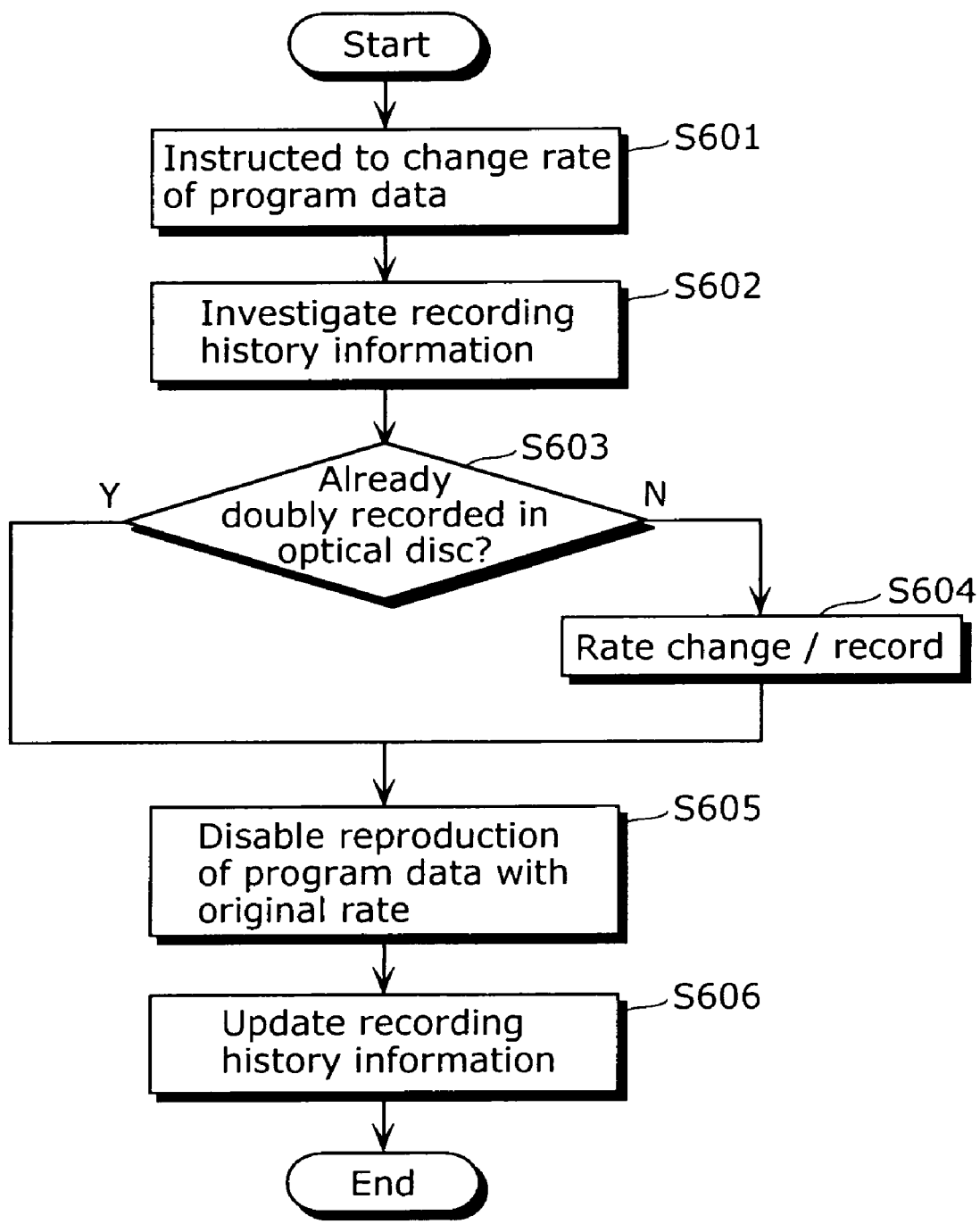
FIG. 9 is a flowchart showing an example of a flow of processing of conversion dubbing in the recording/reproducing device of the second embodiment.

In the recording/reproducing device 100 which records such program data, the operation of the recording/reproducing device 100 when the user has the program data recorded in the optical disc perform conversion dubbing within the optical disc, is described using FIG. 9.

FIG. 9 is a flowchart showing an example of a flow of processing of conversion dubbing in the recording/reproducing device 100 of the second embodiment.

The conversion of bit rate of the program data recorded in the optical disc is instructed by a predetermined operation of the user (S601). This instruction includes information indicating the bit rate which the user desires (hereinafter referred to as a "target bit rate").

Moreover, in terms of the recording/reproducing device 100, an instruction of the bit rate conversion in the second embodiment is an instruction requesting to record the first data in the area where the second data is recorded. In other words, it is the instruction requesting to validate the invalidated second data.

The recording history information is investigated in the recording/reproducing device 100 which receives the aforementioned instruction (S602), and it is confirmed whether or not the program data recorded with the target bit rate is present in the optical disc (S603).

Specifically, the recording/reproduction control unit 13 investigates whether or not, in the recording history information 701, the program data information 702 is present in which: the title of the instructed program data is recorded in the title name 303; the disc ID of the attribute 703 matches the disc ID of the instructed optical disc; information to the effect that an access from the user is not permitted is recorded in the attribute 703; and the bit rate identical to the target bit rate is recorded in the recording mode 306.

In the case where the program data information 702 which fulfills the aforementioned conditions is present in the recording history information 701, it is confirmed that the program data with the target bit rate is present in the optical disc.

In the case where the program data with the target bit rate is present ("Y" at S603), reproduction of the original program data is disabled (S605). Finally, bit rate change processing is completed by updating the recording history information so as to validate the program data with the target bit rate and to invalidate the originally instructed program data (S606).

Specifically, in the case of validation, the attribute 703 of the program data information 702 corresponding to the program data with the target bit rate is rewritten with information to the effect that an access from the user is permitted. With this, the user can access the program data with the target bit rate. On the other hand, in the case of invalidation, the attribute 703 of the program data information 702 corresponding to the instructed program data is rewritten with information to the effect that an access from the user is not permitted. With this, an access to the instructed program data becomes impossible.

With the aforementioned operation, the conversion dubbing is completed. In the case where the user instructs the recording/reproducing device 100 of the first embodiment to perform conversion of the bit rate of the program data recorded in the optical disc, without performing conversion processing of the substantive bit rate, it is possible to complete the processing almost instantly.

Moreover, in the case where the program data with the target bit rate is not present ("N" at S603), the substantive processing is performed so as to convert, to the program data with the target bit rate, the program data which is an object of the bit rate conversion (S604).

Specifically, after a decoder 12 demodulates the program data read out by the recording/reproduction control unit 13, an encoder 11 modulates it with the target bit rate again (S604). Finally, the recording/reproduction control unit 13 records, in the optical disc, the program data with the modulated target bit rate. During the bit rate conversion, the program data before or after the conversion may be accumulated in the buffer memory 16.

After recording the program data in the optical disc, reproduction of the original program data is disabled (S605). Finally, the recording history information is updated, and the bit rate change processing is completed (S606).

In this manner, when the user instructs the recording/reproducing device 100 of the second embodiment to record the program data in the optical disc, the program data with the bit rate instructed by the user (the first data) can be recorded, and at the same time, the program data with the bit rate which is different from the aforementioned bit rate (the second data) can be recorded. This second data and information such as the title concerning the second data are invalidated, and they are controlled so as not to be accessed by the user.

Then, in the case where the user instructs the conversion of the bit rate of the first data recorded in the optical disc, and where the instructed bit rate is the same as the bit rate of the second data, the second data already recorded in the optical disc is validated by making the CPU 5 rewrite the recording history information. In other words, the second data can be accessed by the user. In addition, reproduction of the first data is disabled.

In other words, the recording/reproducing device 100 can provide, in a short time for the user, the same result as the substantive conversion dubbing without performing the substantive bit rate conversion. In addition, from the user's point of view, bit rate conversion is only performed on a single set of program data before and after the conversion dubbing, and the first data and the second data are not recognized simultaneously. In other words, even when the same program data is doubly present in the optical disc actually, it does not confuse the user. In addition, even when the program data has a limitation on copying for copyright protection, the dubbing is performed by observing the limitation.

In addition, in the case of conversion dubbing, disabling reproduction by processing the program data with the bit rate before conversion or management information is effective, when the program data in which the conversion dubbing is performed is returned to the program data with the original bit rate.

For example, the processing details for disabling reproduction of the program data or the management information are stored as processing history in the nonvolatile memory 17. In the case where the instruction to return, to the original bit rate, the bit rate of the program data in which the conversion dubbing is performed is provided, the program data before conversion or the management information of the program data is returned to the state before the processing, based on the processing history. In addition, the program data after the conversion is invalidated.

With this, for example, the user can watch the high image quality before the conversion which has been temporarily converted to the program with a low bit rate and in which the image quality has been lowered. In addition, in the case where the substantive conversion dubbing is performed, it is almost impossible to perform the conversion dubbing which increases bit rate; however, it is possible to realize such dubbing in the present embodiment.

In addition, when the conversion dubbing is performed, reproduction of the program with the bit rate before the conversion may not be disabled, but the program with the bit rate before the conversion may be invalidated. This is also effective when the program data in which conversion dubbing is performed is returned to the program data with the original bit rate.

For example, by recording, in the attribute 703 of the program data information 702 concerning the first data, information indicating that an access is not permitted, the original program data is invalidated. Then, in the case where the conversion dubbing with which the bit rate of the second data is returned to that of the first data is again instructed, the first data is validated by permitting the access of the attribute 703 of the program data information 702 concerning the first data, and the second data is invalidated by not permitting the access of the attribute 703 of the program data information 702 concerning the second data.

In this manner, even when the program with the bit rate before conversion is invalidated, the user can watch the high image quality before the conversion which has been temporarily converted to the program with a low bit rate and in which the image quality has been lowered. In addition, in the case where the substantive conversion dubbing is performed, it is possible to perform the conversion dubbing which increases the bit rate.

In addition, in the case where the program data with the bit rate instructed by the user and the program data with the different bit rate are recorded in the optical disc (S503 in FIG. 7), as described in the first embodiment, for example, the program data with the different bit rate may be invalidated by not recording, in the optical disc, the management information of the program data with the different bit rate. In addition, in the case where the program data with the different bit rate which is invalidated by this method becomes an object for dubbing ("Y" at S603), the management information of the program data with the different bit rate is recorded in the optical disc without performing the substantive conversion of the bit rate. Such information is read out from the management information of the program data with the bit rate instructed by the user or the recording history information. With this, the program data with the different bit rate in the optical disc is validated.

In addition, the data recorded in the optical disc at the same time when the program data with the bit rate instructed by the user is recorded need not to be a single set of data but may be two or more. For example, a plurality of the program data having mutually different bit rates may be recorded. With this, an opportunity with which conversion dubbing can be performed in a short time increases, and convenience of the recording/reproducing device 100 is improved for the user.

In addition, the structure of the program data information 702 need not to be the one shown in FIG. 8. For example, the content of a program, the performer, the genre information and the like may be included. In addition, for example, link information from the program data which can be accessed by the user to the program data which is recorded simultaneously and can not be accessed by the user, may be included. As a method to include the link information, for example, information concerning the address of the optical disc in the second data may be included in the attribute 703 of the program data information 702 of the first data.

In addition, in the case where the first data and the second data are recorded in the optical disc simultaneously, two sets of the program data information 702 corresponding to the respective program data are generated. However, a single set of the program data information may be generated. For example, information concerning a location where two sets of the program data are present is included, such as the recording device 308 and the copy device 309 in the program data information 302 shown in FIG. 3. Furthermore, information about which data can be accessed by the user has only to be included.

In this manner, the data structure of the program data information 702 may be other than the data structure shown in FIG. 8, and depending on requests of the user, requirements for the design of the recording/reproducing device 100 or the like, necessary information has only to be included.

In addition, when the program data is recorded in the optical disc, only in the case where an available space is present in the optical disc, the program data with the bit rate which is different from the instruction of the user is recorded; however, the present invention is not limited to such case.

For example, when the program data is recorded in the optical disc, information such as the title of the program data already recorded in the optical disc is compared with information such as the title of the program data which is instructed to be recorded. As a result of the comparison, in the case where the program data corresponding to such information is present in the optical disc, the bit rate of the program data is compared with the instructed bit rate. As a result of the comparison, in the case where those bit rates are identical, there is no need to record the program data with the instructed bit rate. Thus, the program data is recorded with the bit rate which is different from the instructed bit rate. In addition, the program data recorded with the different bit rate is invalidated so as not to be accessed by the user.

In this manner, in the case where the program data instructed to be recorded is already recorded with the instructed bit rate, the program data may be recorded in the optical disc with the bit rate which is different from the instruction. Because the user can not recognize the program data of the bit rate which is different from the instruction in this case also, it may not confuse the user, and copyright of the program data may also be protected adequately.

In addition, the optical disc is used as an information recording medium provided in the recording/reproducing device 100; however, the present invention is not limited to such medium. For example, the medium may be an HDD or semiconductor memory.

In addition, a single set of program data is simultaneously recorded as two sets of the program data with the respective different bit rates in the second embodiment; however, the present invention is not limited to such case. For example, the two sets of the program data may be recorded by making such program data differ in not the bit rate but the format of the program data. For example, when certain program data is recorded, the program data may be recorded in both the MPEG2-PS and MPEG2-TS formats.

In this manner, after the user records the program data, when the conversion dubbing is performed in which the program data is converted into another format, the conversion dubbing can be completed in a short time by recording the program data in these two formats simultaneously. Moreover, when the program data in these two formats are recorded simultaneously in this manner, the program data in the format instructed by the user has only to be accessed by the user.

In addition, likewise two sets of the program data which have different bit rate and format may be recorded simultaneously.

In addition, in the case where two sets of the program data are recorded separately in different bit rate or format, one of the sets of the program data has the bit rate or format which is instructed by the user. However, the instruction may not be explicit one from the user, and the bit rate or the format may be set in advance.

In other words, on the one hand, the different bit rate or format has only to be the one which does not confuse the user or with which the tacit consent can be obtained from the user, when the user confirms the bit rate or format of the program data recorded in the optical disc afterward. On the other, the bit rate or the format has only to be the one which is thought to be instructed by the user when the conversion dubbing is performed on the program data.

In addition, there is a case where part of or all of the units in the recording/reproducing device 100 shown in FIG. 6 are realized by combination of each unit as an LSI that is an integrated circuit. These may be made into a separate single chip, or part of or all of the units may be made into a single chip.

Figure 10:
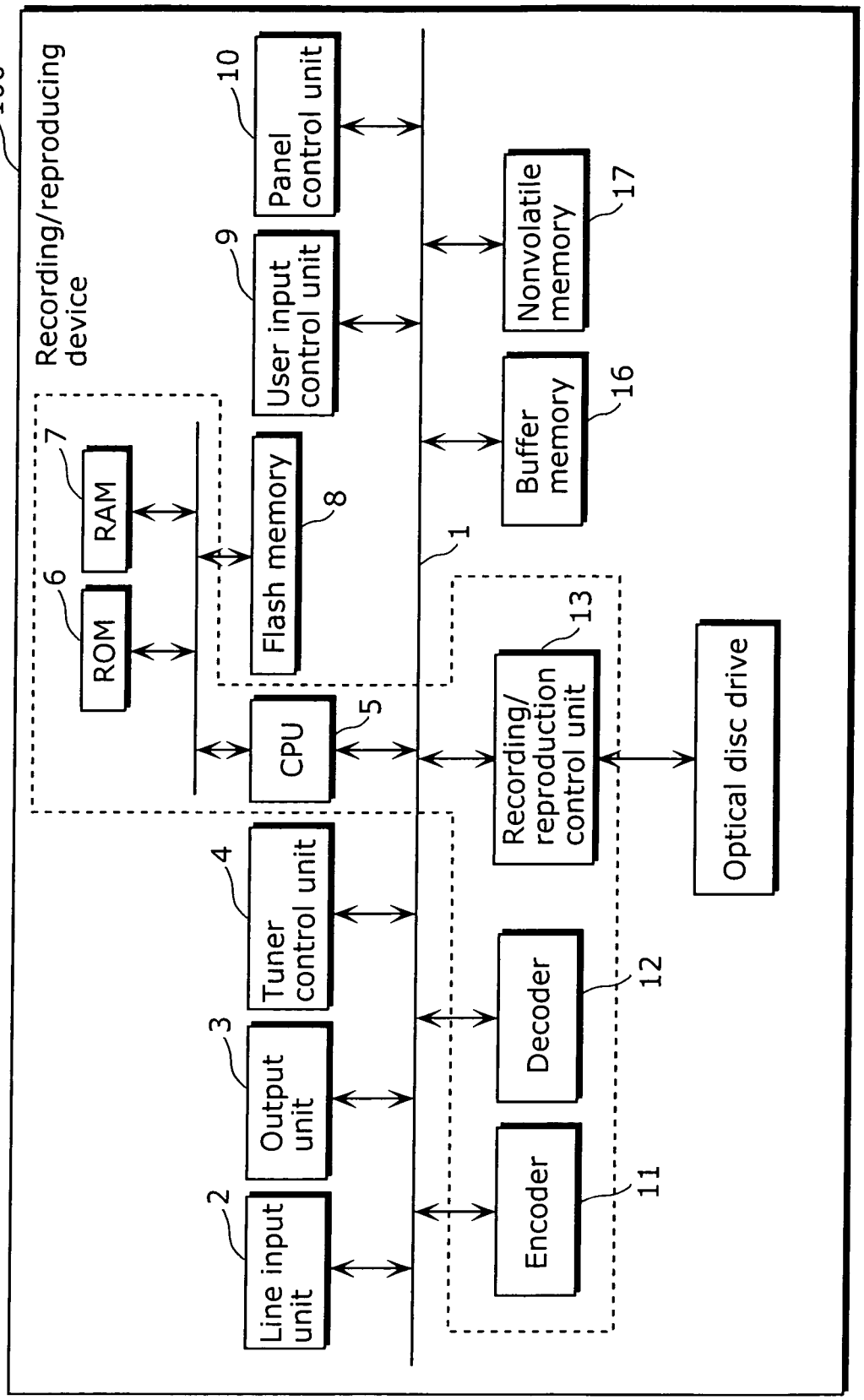
FIG. 10 is a diagram showing an example of range of the units realized as an integrated circuit in the recording/reproducing device of the second embodiment.

FIG. 10 is a diagram showing an example of the range of units realized as an integrated circuit in the recording/reproducing device 100 of the second embodiment. The range enclosed by a doted line in the diagram shows an example of the range of units realized as an integrated circuit. In other words, the recording/reproducing device of the present invention may be realized as an integrated circuit such as an LSI.

Third Embodiment

As the third embodiment of the present invention, a recording/reproducing device having two sets of recording media, namely, an HDD and an optical disc is described, likewise the recording media of the first embodiment.

The structure of the recording/reproducing device 100 of the third embodiment is the same as the recording/reproducing device 100 of the first embodiment, and is shown as in FIG. 1. Therefore, the description of the structure of the recording/reproducing device 100 is omitted.

In addition, when the recording/reproducing device 100 of the third embodiment records program data and performs dubbing of the program data, the operation is the same as that of the recording/reproducing device 100 of the first embodiment, and is shown as in FIG. 2 and FIG. 4. In addition, the recording/reproducing device 100 of the third embodiment includes the recording history information 301, likewise in the recording/reproducing device 100 of the first embodiment. The data structure is also the same as the data structure shown in FIG. 3.

However, after the recording/reproducing device of the third embodiment simultaneously records the same program data in the HDD and the optical disc, when the optical disc is ejected, processing is performed for: providing the user with an opportunity of dubbing, which is completed in a short time, from the HDD 15 to the optical disc; furthermore protecting copyright of the program data which is recorded in the optical disc and invalidated; and avoiding wasting space in the optical disc.

Figure 11:
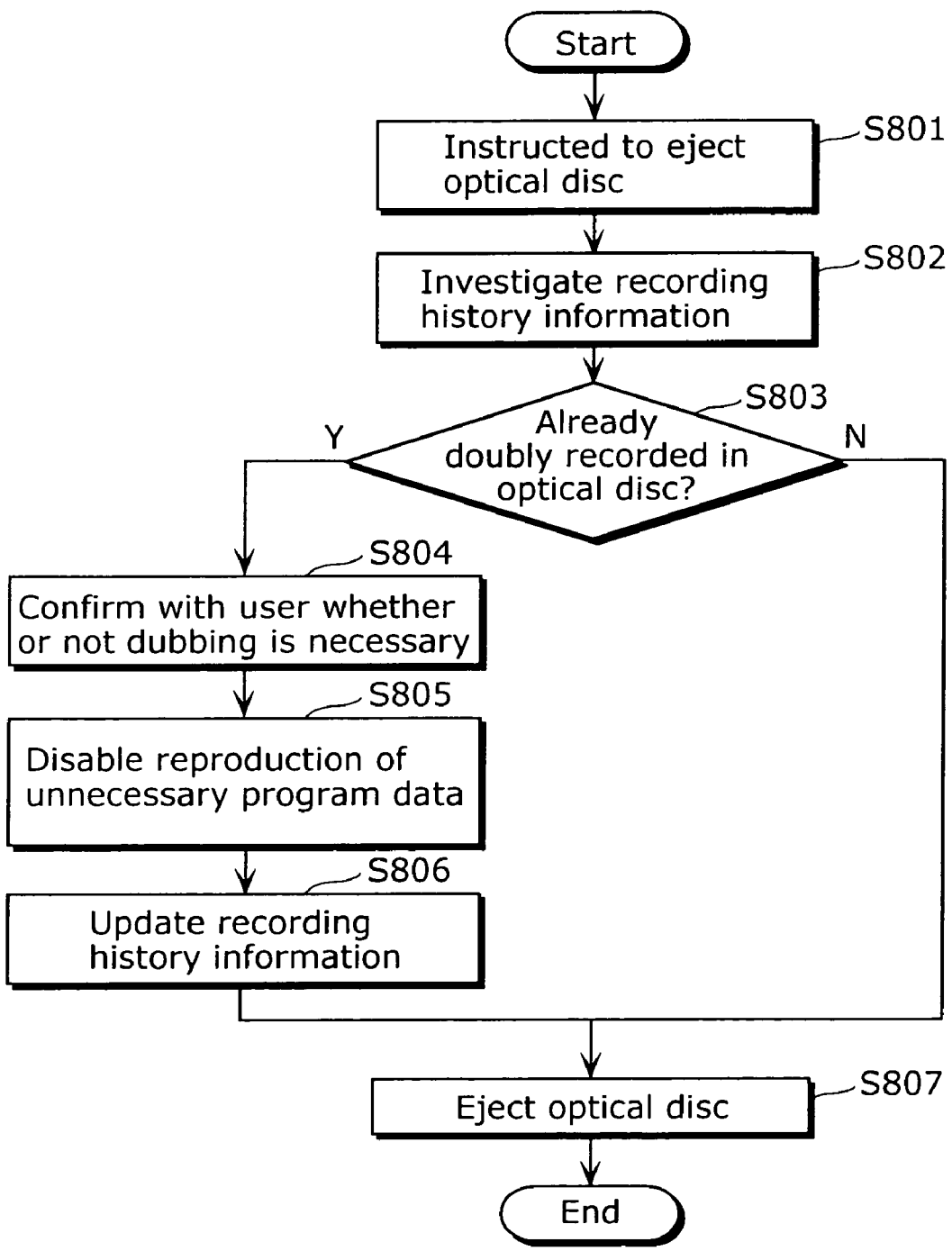
FIG. 11 is a flowchart showing an example of a flow of processing at the time of disc ejection from the recording/reproducing device of the third embodiment.

FIG. 11 is a flowchart showing an example of a flow of processing at the time of disc ejection in the recording/reproducing device 100 of the third embodiment. Moreover, the operation of each processing unit described hereinafter is performed, unless otherwise designated, by control of the CPU 5 based on a program stored in the ROM 6 and the like.

When the ejection of the optical disc is instructed by the panel operation and the like (S801), whether or not the program data is doubly recorded in both the HDD 15 and the optical disc and there is any invalidated program data in the optical disc is confirmed at first by investigating the recording history information 301 (S802).

Here, in the case where at least a single set of the program data which is the same as the program data present in the HDD 15 and is invalidated, is present in the optical disc, as described in the description of the first embodiment, the program data is in the state where dubbing from the HDD 15 to the optical disc in a short time can be performed. This is because the substantive dubbing processing is not required.

Thus, when the program data fulfilling the aforementioned conditions is present in the optical disc which is instructed to be ejected ("Y" at S803), whether or not the applicable program data in the HDD 15 is dubbed to the optical disc is confirmed with the user.

FIG. 12 is a diagram showing an example of a dubbing confirmation screen 900 for urging the user to perform dubbing from the HDD 15 to the optical disc.

The recording/reproducing device 100 of the third embodiment displays the dubbing confirmation screen 900 to the user, and validation of the invalidated program data which is present in the optical disc, in other words, whether or not dubbing from the HDD 15 to the optical disc is performed is confirmed (S804).

In the dubbing confirmation screen 900, information such as the title name of the invalidated program data is displayed. Such information is read out by the CPU 5 from the recording history information 301 which is present in the RAM 7, and transmitted to the output unit 3. Furthermore, with the output unit 3, signals including such information are outputted to a display unit which is not illustrated but connected to the recording/reproducing device 100 so that the user can see the information in the dubbing confirmation screen 900.

In addition, the program data to be an object for display in the dubbing confirmation screen 900 is the program data doubly recorded both in the HDD 15 and the optical disc held in the optical disc drive 14. In this case, as described in the first embodiment, the recording history information 301 is recorded in the program data recorded in the optical disc so as not to be accessed by the user.

In the dubbing confirmation screen 900, a check box 901 is displayed for the user to select the program data desired to be dubbed to the optical disc. As shown in FIG. 12, it is assumed that the program data with "Title A" is selected by the user, and an execution button 902 is selected by the user's remote control operation and the like.

The recording/reproducing device 100 receives a selection by the user, and reproduction of the program data with the "Title A" which is present in the HDD 15 is disabled (S805), and the recording history information 301 is updated (S806). In this case, the disc ID and the like recorded in the copy device 309 of the program data information 302 with the "Title A" is deleted, and the disc ID and the like is recorded in the recording device 308.

With the aforementioned operation, the program data with the "Title A" in the HDD 15 is dubbed to the optical disc without performing the substantive dubbing processing. In other words, from the user's point of view, the dubbing is completed in a short time.

In addition, the program data on which the user does not desire to perform dubbing, for example, the program data with "Title B" and "Title C" in the dubbing confirmation screen 900 shown in FIG. 12 is deleted from the optical disc so as not to be accessed in other recording/reproducing devices. Alternatively, reproduction is disabled so that reproduction and the like becomes not possible after that.

Next, the recording history information 301 is updated. In this case, the disc ID and the like recorded in the copy device 309 of the program data information 302 with the "Title B" and "Title C" is deleted.

With the aforementioned operation, the program data with the "Title B" and "Title C" is not read out from the optical disc. In addition, by not leaving the invalidated program data, it is possible to prevent an available space of the optical disc from being consumed wastefully.

After completion of the aforementioned operation, the optical disc is ejected (S807).

In this manner, when the optical disc is ejected, the recording/reproducing device of the third embodiment can provide the user with an opportunity of dubbing, which is completed in a short time, from the HDD 15 to the optical disc. In addition, regardless of whether or not the user instructs dubbing, it is possible to prevent an available space in the optical disc from being consumed wastefully, and the copyright of the program data recorded in either the HDD 15 or the optical disc can be protected adequately.

Moreover, when the program data is recorded in the optical disc in the recording/reproducing device 100 of the third embodiment, as described in the description of the first embodiment, it may be invalidated by not writing the management information of the program data in the optical disc. In addition, in the case where the program data invalidated by this method becomes an object for dubbing (S804), the management information of the program data is recorded in the optical disc without performing the substantive dubbing processing. Such information is read out from: the management information retracted to the HDD 15 and the like without recording it in the optical disc; the management information of the program data in the HDD 15; the recording history information; or the like. With this, the program data of the optical disc is validated. On the other hand, invalidation is performed by deleting the management information of the program data in the HDD 15 or transferring it to the optical disc, the flash memory 8 and the like.

In addition, information displayed on the dubbing confirmation screen 900 is not limited to information shown in FIG. 12. For example, the format of the program data may be displayed. In addition, bit rate value may be displayed, together with the recording mode or by replacing the recording mode with it. In addition, in the case where the bit rate, recording mode or format is changed before and after dubbing, the bit rate, recording mode or format before and after the dubbing may be displayed. Such information has only to be extracted and displayed by the recording/reproduction control unit 13 from the recording history information or the program data recorded in the HDD 15 or in the optical disc.

In addition, the aforementioned processing in ejecting the optical disc can be executed in the recording/reproducing device 100 of the second embodiment.

In other words, it is assumed that two sets of the program data having the same content and with the different bit rate each other are present in the optical disc, that is, that the first data and the second data which are described in the second embodiment are present. Under this assumption, in the case where ejection of the optical disc is instructed, whether or not the conversion dubbing is performed is confirmed with the user. In the case where the user instructs dubbing, the second data is validated, and reproduction of the first data is disabled. In the case where the user does not instruct dubbing, reproduction of the second data is disabled. After these operations, the program data information 702 corresponding to the program data in which reproduction is disabled is deleted.

After completion of the aforementioned operations, the optical disc is ejected.

In this case also, when the optical disc is ejected, an opportunity of dubbing, which is completed in a short time, in the optical disc can be provided for the user likewise in the recording/reproducing device of the third embodiment. In addition, regardless of whether or not the user instructs dubbing, it is possible to prevent an available space in the optical disc from being consumed wastefully, and the copyright of the program data recorded in the HDD 15 or the optical disc can be protected adequately.

In addition, in the case where the user has the program data recorded in both the HDD 15 and the optical disc or the program data doubly recorded only in the optical disc, the time when the dubbing of such program data is confirmed with the user need not to be the time when the optical disc is ejected. In other words, after the optical disc is ejected and loaded again in the recording/reproducing device, the dubbing may be confirmed with the user. In other words, even after the optical disc is ejected and loaded again in the recording/reproducing device, it is possible to provide an opportunity of dubbing, which is completed in a short time, in the optical disc. In addition, the copyright of the program data recorded in the HDD 15 or the optical disc can be protected adequately.

For example, when the optical disc is ejected, in the case where the program data recorded as the program data which can not be accessed by the user in the recording history information is present, the program data is put in a recognizable state only in the recording/reproducing device 100, and it is put in an unrecognizable state in other devices, so as to enable only the recording/reproducing device 100 to validate it later. For example, recognition is disabled by changing an extension added to a file name of the program data to an extension which cannot be recognized as the program data.

In this case, the recording/reproducing device records, in the nonvolatile memory 17 and the like, the correspondence between the extensions before and after the change. Next, when the optical disc is loaded, in the case where the program data having the extension after the change as a file name is present, the file name of the program data is returned to the extension of the original program data.

With this operation, the program data having the file name in which the extension is changed, is not recognized as the program data in other recording/reproducing devices; therefore, it is not accessed normally. In other words, copyright of the program data is protected adequately. In addition, in the case where the optical disc in which the program data is present is again loaded in the recording/reproducing device 100, it is recognized as the invalidated program data, and an opportunity of dubbing which is completed in a short time can be provided for the user again.

In addition, for example, by recording information indicating invalidation in the contents management information (IFO) that is information for managing the program data present in the optical disc, the operation such as reproduction may not be performed in other recording/reproducing devices. For example, by setting a watch permission flag, it is defined that the flag "1" indicates permission and "0" indicates non-permission. When the optical disc is ejected, in the case where the program data recorded as the program data which can not be accessed by the user in the recording history information is present, "0" is set as the watch permission flag in the IFO corresponding to the program data.

In addition, in the case where the optical disc is loaded in the recording/reproducing device 100 again, whether or not an access by the user to the program data recorded in the optical disc is permitted is determined by referring to the recording history information.

With this, the program data is the data which is not recognized as the program data in other recording/reproducing devices, and is not reproduced. In addition, in the case where the optical disc is loaded in the recording/reproducing device 100 again, it is possible to provide the user with an opportunity of dubbing completed in a short time.

In addition, the definition of the watch permission flag may be extended, and it may be defined that the flag "0" indicates "non-permission" from the user and "invisible" as data. Here, the indication that the program data is invisible is that the amount of the recorded program data is recognized by other recording/reproducing devices as the area where overwrite is possible, and recognized as an available space by the user.

In this manner, in the case where the optical disc is loaded in other recording/reproducing devices, the area where the program data in which the watch permission flag is "0" is recorded is recognized as the area where overwrite is possible. Therefore, in the case where some data is recorded in the optical disc, where necessary, the optical disc can be used by deleting the program data and making an available space.

In addition, in the recording/reproducing device 100, the disc ID of the optical disc which performs recording of the program data is recorded in the recording history information, together with information which identifies the program data. Therefore, in the case where the optical disc is loaded in the recording/reproducing device 100, whether or not the program data of the optical disc is recorded in the recording/reproducing device 100 can be confirmed. In addition, the program data recorded by the recording/reproducing device 100 can be identified among the program data recorded in the optical disc.

Thus, in the case where the optical disc is loaded in the recording/reproducing device 100, the optical disc is the optical disc that performs recording of the program data in the recording/reproducing device 100. In this case, rules of the watch permission flag for the program data recorded in the recording/reproducing device 100 are ignored, and the recording history information is referred to. With this, whether or not the user can access the program data recorded in the optical disc can be determined by the recording history information. In addition, it is possible to provide the user with an opportunity of dubbing completed in a short time. Moreover, the recognition disabling and recognition enabling of the program data by processing the aforementioned identifier and the IFO are the examples of disabling and enabling reproduction respectively in the recording/reproducing device of the present invention.

For example, in the case where a Blu-ray disc is used as the optical disc, as the aforementioned description, a method for disabling reproduction is exemplified hereinafter so as to enable reproduction only in the recording/reproducing device 100.

Figure 13:
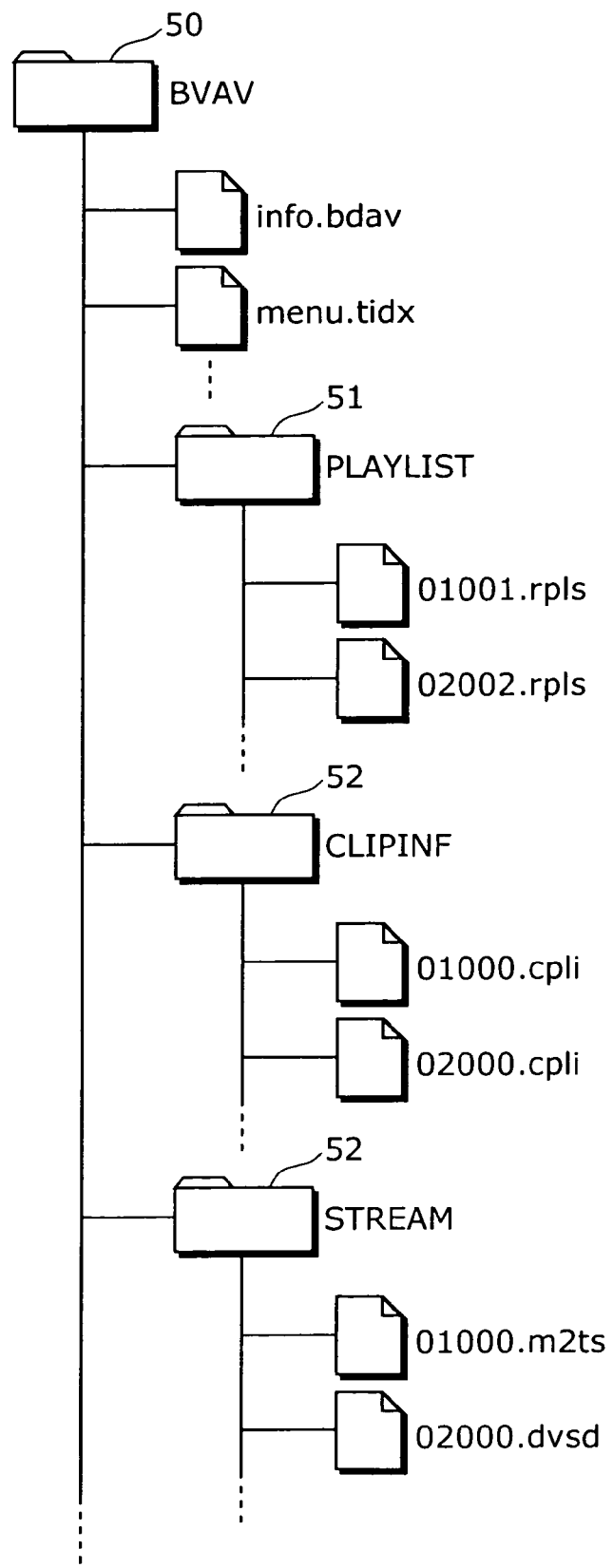
FIG. 13 is a diagram showing the file structure in the Blu-ray disc.

FIG. 13 is a diagram showing the file structure of the Blu-ray disc.

As shown in FIG. 13, a BVAV directory 50 is a root directory in the Blu-ray disc. In addition, 01000.m2ts and 02000.dvsd which are present in a stream directory 53 are program data. It is indicated that the extension ".m2ts" is the MPEG2-TS format, and the extension ".dvsd" is the DV (Digital Video) stream format.

In addition, info.bdav which is present just underneath the BVAV directory 50 is the file in which the management information of the whole directories is recorded, and a PLAYLIST directory 51 and a CLIPINF directory 52 are respective directories in which a file, used for random access to the program data and trick play, is stored separately.

For example, when the recording/reproducing device 100 ejects the Blu-ray disc, the extension of "01000.m2ts" which is the program data is changed to "01000.**". In addition, where necessary, info.bdav is updated. Furthermore, the change details are stored in the nonvolatile memory 17** and the like.

With this, in the case where this Blu-ray disc is loaded in other recording/reproducing devices, neither "01000.**" is recognized as the program data, nor it is reproduced. In addition, when this Blu-ray disc is loaded in the recording/reproducing device 100, based on the change details stored in the nonvolatile memory 17** and the like, by returning, to the original state, the change added to the Blu-ray disc, "01000.m2ts" can be recognized as the program data. Then, by referring to the recording history information, it is possible to provide the user with an opportunity of dubbing completed in a short time.

In addition, by adding another change means to the Blu-ray disc, the program data may be appropriately recognized only in the recording/reproducing device 100.

For example, the program data itself may be put in the directories except a STREAM directory. In addition, by changing a part of the recording details of info.bdav, specific program data may be changed so as not to be recognized as the program data. In addition, information indicating such change details may be encrypted, and recorded in a predetermined location of the Blu-ray disc. In this case, key information and the like for combining information indicating the change details and the encrypted change details has only to be recorded in the nonvolatile memory 17 and the like.

In this manner, when the optical disc is ejected, the recording/reproducing device 100 can put, in a state where recognition is impossible as the program data in other recording/reproducing devices, the program data recorded both in the HDD 15 and the optical disc or the program data doubly recorded only in the optical disc.

In addition, when the optical disc is loaded again in the recording/reproducing device, whether or not the program data of the optical disc is recorded in the recording/reproducing device 100 can be confirmed. Furthermore, in the case where the program data put in a state where it can not be recognized as the program data by the recording/reproducing device 100 is present in the optical disc, the recording/reproducing device 100 can appropriately recognize the program data. With this, it is possible to provide the user with an opportunity of dubbing, completed in a short time, for the program data which is recognized appropriately.

Therefore, even when the user can not determine whether or not dubbing is performed in ejecting the optical disc, the user can eject the disc without hesitation.

In addition, reproduction of the invalidated program data present in the optical disc may be disabled, according to a predetermined rule without making the user confirm it. For example, the program data for which a predetermined period has passed while being invalidated in the optical disc may be deleted from the optical disc.

In addition, for example, in the case where the user newly records the program data in the optical disc, when the available space in the optical disc is insufficient, the program data which can not be accessed by the user may be deleted.

Moreover, the aforementioned processing and the like for the optical disc can be executed in either the first embodiment or the second embodiment in the recording/reproducing device 100. In addition, likewise in the recording/reproducing device 100 of the third embodiment, even in the case where dubbing of the program data is confirmed in ejecting the optical disc, change and the like may be added to the optical disc so that the program data for which the instruction of dubbing is not given can be dubbed after the optical disc is loaded again.

In addition, according to the recording/reproducing device 100 of the first embodiment to the third embodiment, information recorded in the recording medium such as the HDD 15 is the program data. However, the information may be information other than program data such as voice data, for example, the MP3 (MPEG Audio Layer-3). In other words, information to be an object for recording and dubbing in the recording/reproducing device of the present invention has only to be information which can be recorded in a recording medium.

In addition, at least one of the HDD 15 and the optical disc is loaded, as a recording medium, in the recording/reproducing device 100 of the first embodiment to the third embodiment. However, it is not necessary for the recording/reproducing device 100 to include a recording medium. For example, the HDD 15 or the optical disc drive 14 may be present as an external device, and such device and the recording/reproducing device 100 may be connected to each other.

INDUSTRIAL APPLICABILITY

The recording/reproducing device according to the present invention can be applied to a device which performs dubbing of information and a method with which the dubbing is performed. In particular, it is useful as a DVD recorder, a hard disc recorder, and a Blu-ray disc recorder which record/reproduce contents such as a broadcast program.

The invention claimed is:

1. A recording and reproducing device that records and reproduces information, said device comprising:
   an obtainment unit operable to obtain first information;
   an information recording unit operable to record the first information in a first recording medium and to record second information in a second recording medium, the first information being obtained by said obtainment unit, and the second information having the same content as the first information;
   a management data recording medium in which management data is recorded, the management data indicating that one of the first information and the second information is valid and that the other one of the first information and the second information is invalid;
   a management data recording unit operable, when said information recording unit records the first information and the second information, to generate the management data indicating that the first information is valid and the second information is invalid and to record the management data in said management data recording medium;
   a receiving unit operable to receive a recording instruction which requests the first information recorded in the first recording medium to be recorded in the second recording medium;
   an invalidation unit operable to invalidate the valid first information by making said management data recording unit update the management data to indicate that the first information is invalid, in the case where said receiving unit receives the recording instruction; and
   a validation unit operable to validate the invalid second information by making said management data recording unit update the management data to indicate that the second information is valid, in the case where said receiving unit receives the recording instruction.

2. The recording and reproducing device according to claim 1, further comprising
   a judgment unit operable to judge whether or not there is a predetermined relationship between attribute information of the first information obtained by said obtainment unit and attribute information of information which is recorded in the second recording medium,
   wherein said information recording unit is operable to record the second information in the second recording medium in the case where said judgment unit judges that there is the predetermined relationship between the attribute information of the first information and the attribute information of the information which is recorded in the second recording medium.

3. The recording and reproducing device according to claim 1, further comprising
   a second information generation unit operable to generate the second information by converting a format of the first information to a format other than the format of the first information,
   wherein said information recording unit is operable to record the second information in the second recording medium, the second information being generated by said second information generation unit.

4. The recording and reproducing device according to claim 3,
   wherein said second information generation unit is operable to convert the format of the first information to a format corresponding to an available space, which is the space where additional recording is possible, in the second recording medium.

5. The recording and reproducing device according to claim 1, further comprising
   a second information generation unit operable to generate the second information by converting a bit rate of the first information to a bit rate other than the bit rate of the first information,
   wherein said information recording unit is operable to record the second information in the second recording medium, the second information being generated by said second information generation unit.

6. The recording and reproducing device according to claim 5,
   wherein said second information generation unit is operable to convert the bit rate of the first information to a bit rate corresponding to an available space, which is the space where additional recording is possible, in the second recording medium.

7. The recording and reproducing device according to claim 1, further comprising
   a second recording medium confirmation unit operable to confirm whether or not the second information is recorded in the second recording medium by confirming that the management data indicating that the second information is invalid is recorded in said management data recording medium,
   wherein said second recording medium confirmation unit is operable to make said validation unit validate the second information in the case of confirming that the second information is recorded in the second recording medium.

8. The recording and reproducing device according to claim 1, further comprising:
   a size detection unit operable to detect size of the second information; and
   a comparison unit operable to compare the size of the second information detected by said size detection unit with an available space, which is the space where additional recording is possible, in the second recording medium,
   wherein said information recording unit is operable to record the second information in the second recording medium in the case where the size of the second information is equal to or less than the available space as a result of the comparison performed by said comparison unit.

9. The recording and reproducing device according to claim 1, further comprising:
   a size detection unit operable to detect size of the first information;
   a comparison unit operable to compare the size of the first information detected by said size detection unit with an available space, which is the space where additional recording is possible, in the second recording medium; and
   a second information generation unit operable to generate the second information by converting a format or a bit rate of the first information to a different format or bit rate so as to make the size of the second information equal to or less than the available space in the case where the size of the first information exceeds the available space as a result of the comparison performed by said comparison unit,
   wherein said information recording unit is operable to record the second information in the second recording medium, the second information being generated by said second information generation unit.

10. The recording and reproducing device according to claim 1, further comprising
a reproduction disabling unit operable to disable reproduction of the first information by deleting or processing the first information or by deleting or processing management information that is included in the first recording medium, in the case where said receiving unit receives the recording instruction, the management information being used for managing information in the first recording medium.

11. A recording and reproducing device that records and reproduces information, said device comprising:
an obtainment unit operable to obtain first information;
an information recording unit operable to record the first information in a first recording area and to record second information in a second recording area, the first information being obtained by said obtainment unit, and the second information having the same content as the first information;
an invalidation unit operable to invalidate the second information;
a receiving unit operable to receive a recording instruction which requests the first information recorded in the first recording area to be recorded in the second recording area; and
a validation unit operable to validate the invalidated second information in the case where said receiving unit receives the recording instruction,
wherein the first recording area is a first recording medium, and the second recording area is a second recording medium,
said recording and reproducing device further comprises:
a first holding unit which holds the first recording medium;
a second holding unit which holds the second recording medium;
an ejection instruction detection unit operable to detect an ejection instruction requesting to eject the second recording medium from said second holding unit to the outside of said recording and reproducing device;
a reproduction disabling unit operable to disable reproduction of the second information which is recorded in the second recording medium and is invalidated, in the case where said ejection instruction detection unit detects the ejection instruction; and
an ejection unit operable to eject the second recording medium from said second holding unit to the outside of said recording and reproducing device, after said reproduction disabling unit disables reproduction of the second information.

12. The recording and reproducing device according to claim 11, further comprising
a recording confirmation unit operable to confirm with a user whether or not the first information corresponding to the second information recorded in the second recording medium and invalidated is recorded in the second recording medium in the case where said ejection instruction detection unit detects the ejection instruction,
wherein said reproduction disabling unit is operable to disable reproduction of the first information in the case where said recording confirmation unit confirms that the first information is to be recorded in the second recording medium, and to disable reproduction of the second information in the case where said recording confirmation unit confirms that the first information is not to be recorded in the second recording medium, and
said ejection unit is operable to eject the second recording medium from said second holding unit to the outside of said recording and reproducing device after said reproduction disabling unit disables reproduction of the first information or the second information.

13. The recording and reproducing device according to claim 11, further comprising:
a processing detail recording unit operable to record details of processing so that said reproduction disabling unit disables reproduction of the second information; and
a reproduction enabling unit operable to enable, based on the details of the processing, reproduction of the second information in which reproduction is disabled, after the second recording medium which is ejected by said ejection unit is held by said second holding unit again.

14. A recording and reproducing device that records and reproduces information, said device comprising:
an obtainment unit operable to obtain first information;
an information recording unit operable to record the first information in a first recording area and to record second information in a second recording area, the first information being obtained by said obtainment unit, and the second information having the same content as the first information;
an invalidation unit operable to invalidate the second information;
a receiving unit operable to receive a recording instruction which requests the first information recorded in the first recording area to be recorded in the second recording area; and
a validation unit operable to validate the invalidated second information in the case where said receiving unit receives the recording instruction,
wherein the first recording area and the second recording area are present in a recording medium,
said recording and reproducing device further comprises:
a holding unit which holds the recording medium;
an ejection instruction detection unit operable to detect an ejection instruction requesting to eject the recording medium from said holding unit to the outside of said recording and reproducing device;
a reproduction disabling unit operable to disable reproduction of the second information which is recorded in the recording medium and is invalidated, in the case where said ejection instruction detection unit detects the ejection instruction; and
an ejection unit operable to eject the recording medium from said holding unit to the outside of said recording and reproducing device, after said reproduction disabling unit disables reproduction of the second information.

15. The recording and reproducing device according to claim 14,
wherein a format or a bit rate of the first information is different from a format or a bit rate of the second information,
said recording and reproducing device further comprises
a recording confirmation unit operable to confirm whether or not the first information corresponding to the second information recorded in the recording medium and invalidated is converted to the same format or bit rate as the second information, in the case where said ejection instruction detection unit detects the ejection instruction, wherein said reproduction disabling unit is operable to disable reproduction of the first information in the case where said recording confirmation unit confirms that the first information is to be converted to the same format or bit rate as the second information, and operable to disable reproduction of the second information in the case where said recording confirmation unit confirms that the first information is not to be converted to the same format or bit rate as the second information, and said ejection unit is operable to eject the recording medium from said holding unit to the outside of said recording and reproducing device, after said reproduction disabling unit disables reproduction of the first information or the second information.

16. The recording and reproducing device according to claim 14, further comprising:

a processing detail recording unit operable to record details of processing so that said reproduction disabling unit disables reproduction of the second information; and a reproduction enabling unit operable to enable, based on the details of processing, reproduction of the second information in which reproduction is disabled, after the recording medium which is ejected by said ejection unit is held by said holding unit again.

17. An information recording method comprising:

an obtainment step of obtaining first information;

an information recording step of recording the first information in a first recording medium and recording second information in a second recording medium, the first information being obtained in said obtainment step, and the second information having the same content as the first information;

a management data recording step of generating management data indicating that the first information is valid and the second information is invalid, and recording the management data in a management data recording medium, when the first information and the second information are recorded in said information recording step;

a receiving step of receiving an instruction requesting the first information recorded in the first recording medium to be recorded in the second recording medium;

an invalidation step of invalidating the valid first information by updating the management data to indicate that the first information is invalid, in the case where the recording instruction is received in said receiving step; and a validation step of validating the invalid second information by updating the management data to indicate that the second information is invalid, in the case where the instruction is received in said receiving step.

18. The recording and reproducing device according to claim 1, wherein said information recording unit simultaneously records the first information in the first recording medium and the second information in the second recording medium.

19. The recording and reproducing method according to claim 17, wherein said information recording step comprises simultaneously recording the first information in the first recording medium and the second information in the second recording medium.

* * * * *